United States Patent
Mortazavi

(10) Patent No.: US 9,104,497 B2
(45) Date of Patent: Aug. 11, 2015

(54) METHOD AND SYSTEM FOR WORK LOAD BALANCING

(71) Applicant: YAHOO! INC., Sunnyvale, CA (US)

(72) Inventor: Masood Mortazavi, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 273 days.

(21) Appl. No.: 13/671,046

(22) Filed: Nov. 7, 2012

(65) Prior Publication Data

US 2014/0129715 A1    May 8, 2014

(51) Int. Cl.
*G06F 15/173* (2006.01)
*G06F 9/50* (2006.01)
*H04L 29/08* (2006.01)

(52) U.S. Cl.
CPC ........ *G06F 9/5083* (2013.01); *H04L 29/08144* (2013.01)

(58) Field of Classification Search
CPC ................. G06F 9/5083; H04L 29/08144
USPC .................................. 709/226, 223
See application file for complete search history.

(56) References Cited

U.S. PATENT DOCUMENTS

| 2010/0240373 A1* | 9/2010 | Ji et al. ................. 455/436 |
| 2013/0073552 A1* | 3/2013 | Rangwala et al. ........... 707/737 |
| 2014/0046956 A1* | 2/2014 | Zenger et al. .............. 707/748 |

* cited by examiner

*Primary Examiner* — Dustin Nguyen
*Assistant Examiner* — Joel Mesa
(74) *Attorney, Agent, or Firm* — Pillsbury Winthrop Shaw Pittman LLP

(57) ABSTRACT

Method, system, and programs for balancing work load in a distributed system. A plurality of resource units in the distributed system are ranked based a plurality of multi-dimensional load metrics determined from each of the plurality of resource units. The plurality of resource units are divided into a plurality of resource unit groups based on the ranking of the plurality of resource units. At least one pair of resource unit groups is formed. Each of the at least one pair of resource unit groups is assigned with a probability of load balancing action. For each pair of resource unit groups, a load balancing action is determined based on the assigned probability of load balancing action.

18 Claims, 19 Drawing Sheets

METHOD AND SYSTEM FOR WORK LOAD BALANCING

BACKGROUND

1. Technical Field

The present teaching relates to methods, systems, and programming for work load balancing. Particularly, the present teaching is directed to methods, systems, and programming for work load balancing in a distributed system.

2. Discussion of Technical Background

Distributed computing is a field of computer science that studies distributed systems, which include multiple autonomous computers or parallel virtual machines that communicate through a computer network, such as a computer cluster having multiple nodes. The machines in a distributed system interact with each other in order to achieve a common goal. In distributed computing, a problem is divided into many tasks, each of which is solved by one or more computers, such as the nodes of a computer cluster. Distributed systems and applications may be applied as various paradigms, including grid computing, utility computing, edge computing, and cloud computing by which users may access the server resources using a computer, netbook, tablet, smart phone, or other device through the Internet.

Most distributed systems serving web applications, such as cloud storage and cloud computing systems, behave as dynamic systems with a significant amount of "noise" superimposed on periodic behavior and sudden variations due to garbage collection, scans, etc. In highly scalable and distributed data systems, balancing work load becomes a significant problem because data and query processing must be distributed over existing physical resources. Data storage and processing must also be redistributed as resource configuration changes due to resource optimization and churn events such as physical resource failures, physical resource commissioning, and decommissioning. Finally, application-specific deployment, changes, and processing might give rise to load imbalances, which need to be corrected.

Some known solutions of work load balancing in a distributed system utilize a calculation-based control method. The calculation-based control method is based on statically assigning work assignments to sequenced physical resources. These know solutions, however, lack global registration mechanisms that can monitor an overall work load distribution among the entire system and dynamically balance the work load based on predefined balancing policies.

Moreover, existing controllers of massively scalable distributed systems are too primitive to act as dynamic governors over a large set of possible operational modes. In other words, the existing controllers perform balancing at the extreme edge. However, it is impossible to know the absolutely most optimal decision in some cases, such as when new servers are added in generations, new servers are added incrementally, load shifts are happened in waves, or load exchanges run in parallel. In fact, the most optimal decision may actually reduce the space of possible exchanges of load among serving resources.

Therefore, there is a need to provide a solution for automatically performing dynamic work load balancing in various highly distributed, scalable, and elastic data processing and management systems, which aggregate large sets of physical computers and storage resources.

SUMMARY

The present teaching relates to methods, systems, and programming for work load balancing. Particularly, the present teaching is directed to methods, systems, and programming for work load balancing in a distributed system.

In one example, a method, implemented on at least one machine each having at least one processor, storage, and a communication platform connected to a network for balancing work load in a distributed system is presented. A plurality of resource units in the distributed system are ranked based a plurality of multi-dimensional load metrics determined from each of the plurality of resource units. The plurality of resource units are divided into a plurality of resource unit groups based on the ranking of the plurality of resource units. At least one pair of resource unit groups is formed. Each of the at least one pair of resource unit groups is assigned with a probability of load balancing action. For each pair of resource unit groups, a load balancing action is determined based on the assigned probability of load balancing action.

In a different example, a system for balancing work load in a distributed system is presented, which includes a ranking module and an action module. The ranking module is configured to rank a plurality of resource units in the distributed system based a plurality of multi-dimensional load metrics determined from each of the plurality of resource units. The ranking module is also configured to divide the plurality of resource units into a plurality of resource unit groups based on the ranking of the plurality of resource units. The action module is configured to form a plurality of pairs of resource unit groups. Each pair of resource unit groups is assigned with a probability of load balancing action. The action module is also configured to, for each pair of resource unit groups, determine a load balancing action based on the assigned probability of load balancing action.

Other concepts relate to software for balancing work load in a distributed system. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for balancing work load in a distributed system, wherein the information, when read by the machine, causes the machine to perform a series of steps. A plurality of resource units in the distributed system are ranked based a plurality of multi-dimensional load metrics determined from each of the plurality of resource units. The plurality of resource units are divided into a plurality of resource unit groups based on the ranking of the plurality of resource units. At least one pair of resource unit groups is formed. Each of the at least one pair of resource unit groups is assigned with a probability of load balancing action. For each pair of resource unit groups, a load balancing action is determined based on the assigned probability of load balancing action.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of work load balancing in a distributed system at a global level in real-time. By incorporating fuzziness, a more robust and versatile controller is built that can operate on the average more optimally in a larger set of scenarios. The method and system disclosed herein combine the execution of a set of controller rules according to a set of assigned probabilities. In this way, it makes a larger set of control actions possible but assigning some higher probabilities than others, thereby allowing capture of some a little less optimal load balancing decisions and allowing more load balancing actions to run in parallel.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

Figure 1A:
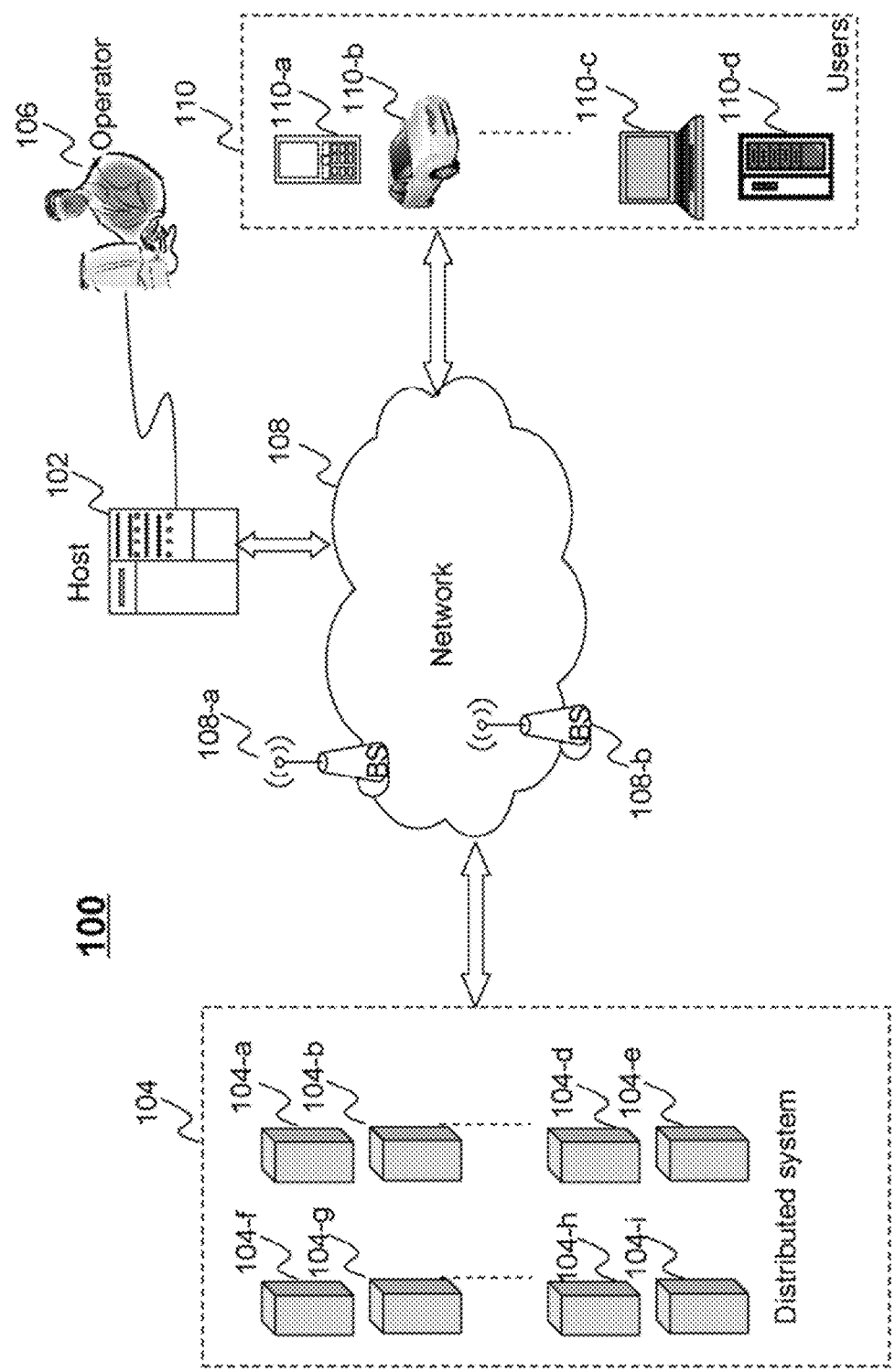
FIGS. 1(a) and (b) depict exemplary embodiments of a distributed system in which work load balancing is applied, according to different embodiments of the present teaching.
Figure 1B:
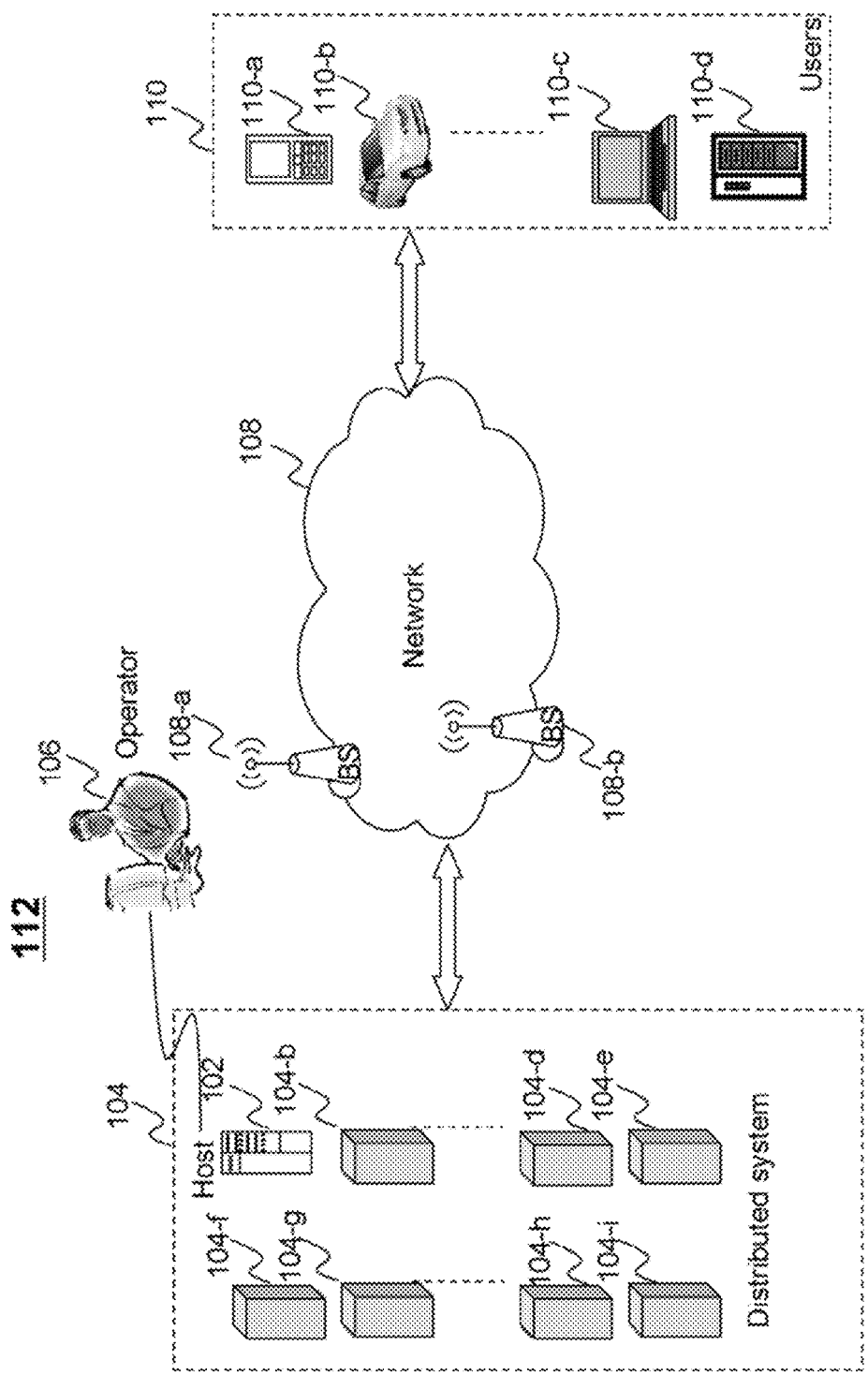

FIGS. 1(a) and 1(b) depict high level exemplary system configurations in which work load balancing in a distributed system can be dynamically performed, according to an embodiment of the present teaching. In FIG. 1(a), the exemplary system 100 includes a host 102, a distributed system such as a cluster 104, an operator 106, a network 108, and users 110. The network 108 may be a single network or a combination of different networks. For example, the network 108 may be a local area network (LAN), a wide area network (WAN), a public network, a private network, a proprietary network, a Public Telephone Switched Network (PSTN), the Internet, a wireless network, a virtual network, or any combination thereof. The network 108 may also include various network access points, e.g., wired or wireless access points such as base stations or Internet exchange points 108-a, . . . , 108-b, through which a data source may connect to the network in order to transmit information via the network.

The cluster 104 in which the work load balancing to be performed may include a plurality of nodes 104-a, 104-b, . . . 104-h, 104-i, which communicate through the network 108 or through an internal network (not shown). The nodes 104-a, 104-b, . . . 104-h, 104-i may include autonomous physical machine, such as a server, a workstation, a desktop or laptop computer, a tablet, a smart phone, a television, a game console, or any other suitable machine. Some or all of the nodes 104-a, 104-b, . . . 104-h, 104-i may be parallel virtual machines implemented by either software emulation or hardware virtualization. The cluster 104 may be a set of machines owned by one entity, e.g., an enterprise, and maintained as a server farm or server cluster where the servers are mounted on racks in a server room or data center. The cluster 104 may also be a collection of machines owned by different entities and that are physically separate from each other at a distance. Each node 104-a, 104-b, . . . 104-h, 104-i may include one or more resource units, which are physical capacities to which units of work (load-quanta) are assigned. For example, an actual physical resource (node) may have multiple capacities, each having its own load. The resource unit may be a storage unit, e.g., disk and memory, a computing unit, e.g., CPU and GPU, or a combination thereof. In this example, the cluster 104 is a highly distributed, scalable and elastic storage and processing system, e.g., a cloud serving system, in which the number of resource units may be dynamically changed, and load may be dynamically shifted among resource units.

Users 110 may be of different types such as users connected to the network via desktop connections (110-d), users connecting to the network via wireless connections such as through a laptop (110-c), a handheld device (110-a), or a built-in device in a motor vehicle (110-b). A user may access to the cluster 104 by sending a request to the cluster 104 via the network 108 and receiving a result from the cluster 104 through the network 108.

In this exemplary system 100, an operator 106, who may be a network administrator, operator, developer, or customer of the cluster 104, may configure the host 102 via an internal or proprietary network connection to perform the work load balancing of the cluster 104. The host 102, in response to the configuration information such as load balancing policies and model parameters, may collect or receive multi-dimensional load metrics from all the resource units of the cluster 104 and compute a load deviance for each resource unit based on a global statistical load model and the real-time multi-dimensional load metrics of the cluster 104. The load deviances may be used by the host 102 to rank the resource units in the cluster 104 and determine load balancing actions based on load balancing policies provided by the operator 106 to achieve desired work load balancing objectives. Various global statistical load models based on different statistical moments, such as but not limited to mean, variance, median, percentile, etc., may be used to deduce the load balancing actions. In this example, the load balancing policies may include a fuzzy dynamic control mechanism that combines the execution of a set of control actions according to a set of probabilities assigned to pairs of resource unit groups in the ranking.

FIG. 1(b) presents another similarly system configuration 112 as what is shown in FIG. 1(a) except that the host 102 is also one of the nodes of the cluster 104. That is, one machine in the cluster 104 acts as both the host for controlling the work load balancing and a node of the cluster 104. It is noted that different configurations as illustrated in FIGS. 1(a) and 1(b) can also be mixed in any manner that is appropriate for a particular application scenario.

Figure 2:
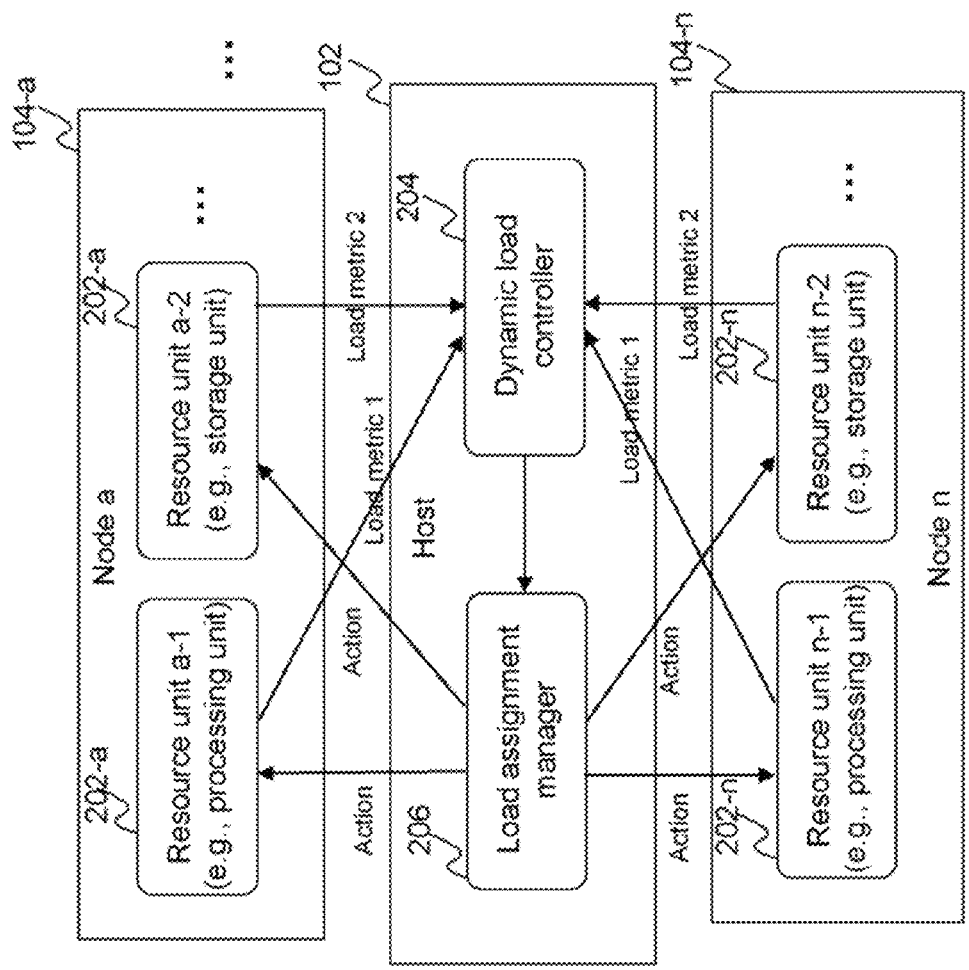
FIG. 2 is a high level exemplary system diagram of a system for balancing work load in a distributed system, according to an embodiment of the present teaching.

FIG. 2 shows a more detailed high level exemplary system diagram of the system 100 shown in FIG. 1(a), according to one application embodiment of the present teaching. In this exemplary embodiment, the system 100 includes a host 102 and a plurality of cluster nodes 104-a ... 104-n, each including one or more resource units 202. The host 102 in this example includes a dynamic load controller 204 and a load assignment manager 206 operatively coupled to each other. The dynamic load controller 204 in conjunction with the load assignment manager 206 has a self-tuning capability based on feedback at a larger time-scale. The dynamic load controller 204 is configured to dynamically determine a set of load balancing actions based on real-time collecting or receiving of multi-dimensional load metrics from the resource units 202-a, ..., 202-n of the nodes 104-a, ..., 104-n and based on the fuzzy dynamic control mechanism. The load assignment manager 206 may be a central assignment controller that registers the mapping from work assignments to resource units. The work assignments may exist in the form of load-quanta that can be shifted and re-quantized by the load assignment manager 206. The load assignment manager 206 is configured to apply each of the determined load balancing actions to the corresponding resource units 202-a, ..., 202-n of the nodes 104-a, ..., 104-n in parallel. For example, the resource units a-1 and n-1 may be storage units and their associated load metric may be memory or disk usage; the resource units a-2 and n-2 may be computing units and their associated load metric may be CPU or GPU usage. The multiple-dimensional load metrics may also include, but are not limited to, query length, latency, I/O usage, network usage, and any other suitable load metric, each representing one dimension of load metrics. The load balancing actions include, for example, exchanging work between two resource units or resource unit groups (load exchange), assigning work to a resource unit, re-assigning work from one resource unit to another resource unit, splitting work among a plurality of resource units (load split), and keeping the current work assignment (no further action).

Figure 3:
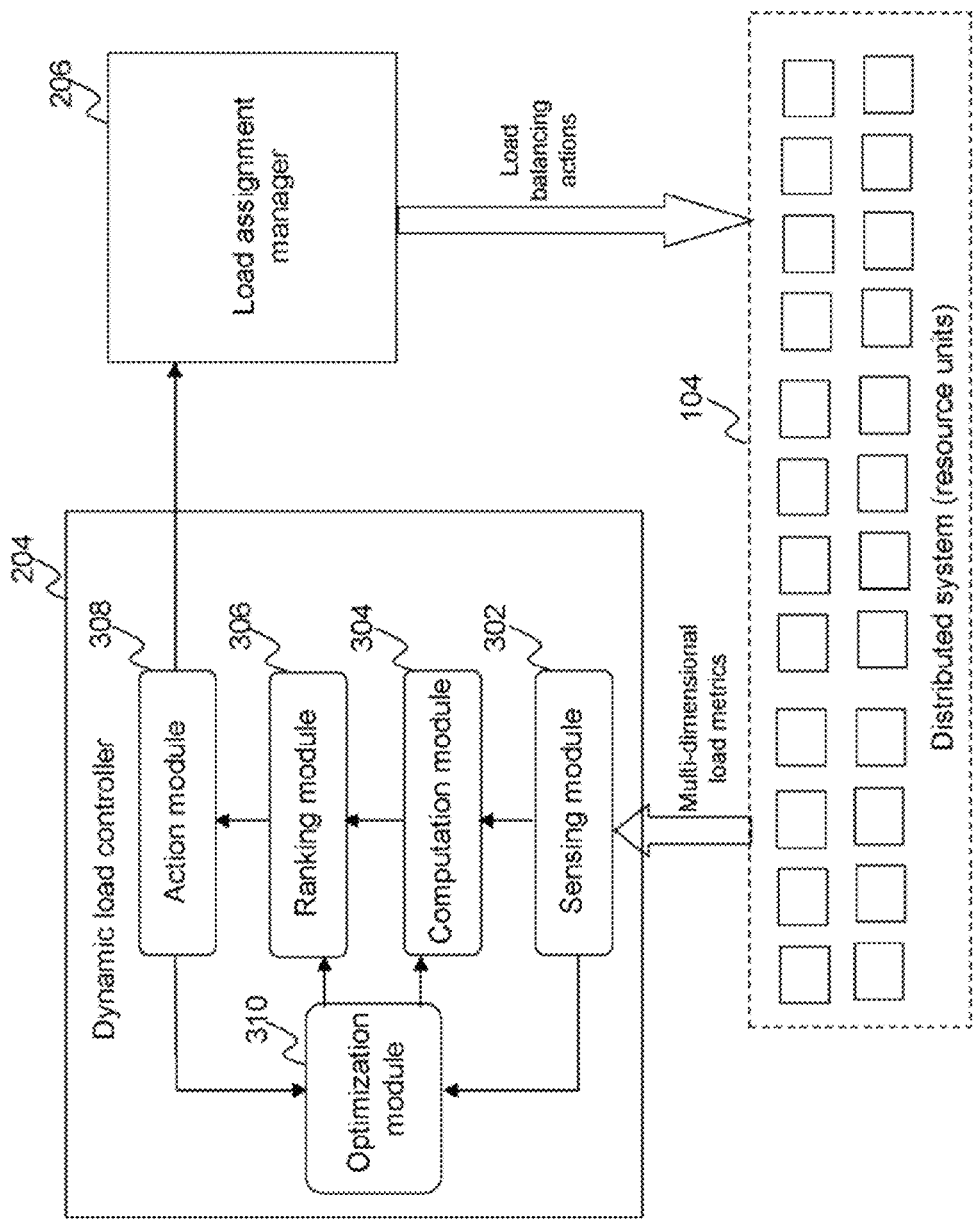
FIG. 3 is a depiction of an exemplary dynamic load controller of the system for balancing work load in a distributed system shown in FIG. 2, according to an embodiment of the present teaching.

FIG. 3 depicts an exemplary diagram of the dynamic load controller 204, according to an embodiment of the present teaching. In this example, the dynamic load controller 204 includes a sensing module 302, a computation module 304, a ranking module 306, an action module 308, and an optimization module 310. The sensing module 302 is configured to receive a plurality of multi-dimensional load metrics from a plurality of resource units in the distributed system 104. That is, the sensing module 302 gathers the resource unit-specific and cluster-wide load data in a predetermined time interval (sampling frequency). In general, the smaller the granularity and the greater the timeliness of data fed into the sensing module 302, the greater the ability of the dynamic load controller 204 to perform control actions. In this example, the time interval for updating the load data is 5 minutes. For example, each resource unit may collect one or more load metrics for a 5-minute window and adds them to the previous value by applying decay as follows:

$$\text{Load metric} = \text{decay\_fraction} \times \text{Load metric} + (1 - \text{decay\_fraction}) \times \text{Load metric}_{5\ min} \quad (1).$$

The default value of decay_fraction may be, for example, 0.8. The slow decay is used to prevent short-term variation in request rate. It is understood that, however, the time window for sampling may not be predetermined or fixed in other examples. In those examples, the sensing module 302 may passively receive the load data and record the last time the data arrives. As such, the sensing module 302 may calculate each individual time difference and use it as the time interval for the analysis performed by the dynamic load controller 204. In other words, in those examples, the time window may vary from time to time, depending on how fast or slow the load data arrives. As noted above, the plurality of multi-dimensional load metrics received by the sensing module 302 include at least one of latency, query length, disk usage, processing unit usage, memory usage, input/output unit usage, network usage, and any combination thereof, each representing one dimension of load metrics.

In this example, the computation module 304 is operatively coupled to the sensing module 302. The computation module 304 is configured to compute a load deviance for each resource unit based on a global statistical load model and the received plurality of multi-dimensional load metrics. Various global statistical load models based on different statistical moments, such as but not limited to mean, variance, median, percentile, etc., may be used to deduce the load balancing actions.

Figure 4A:
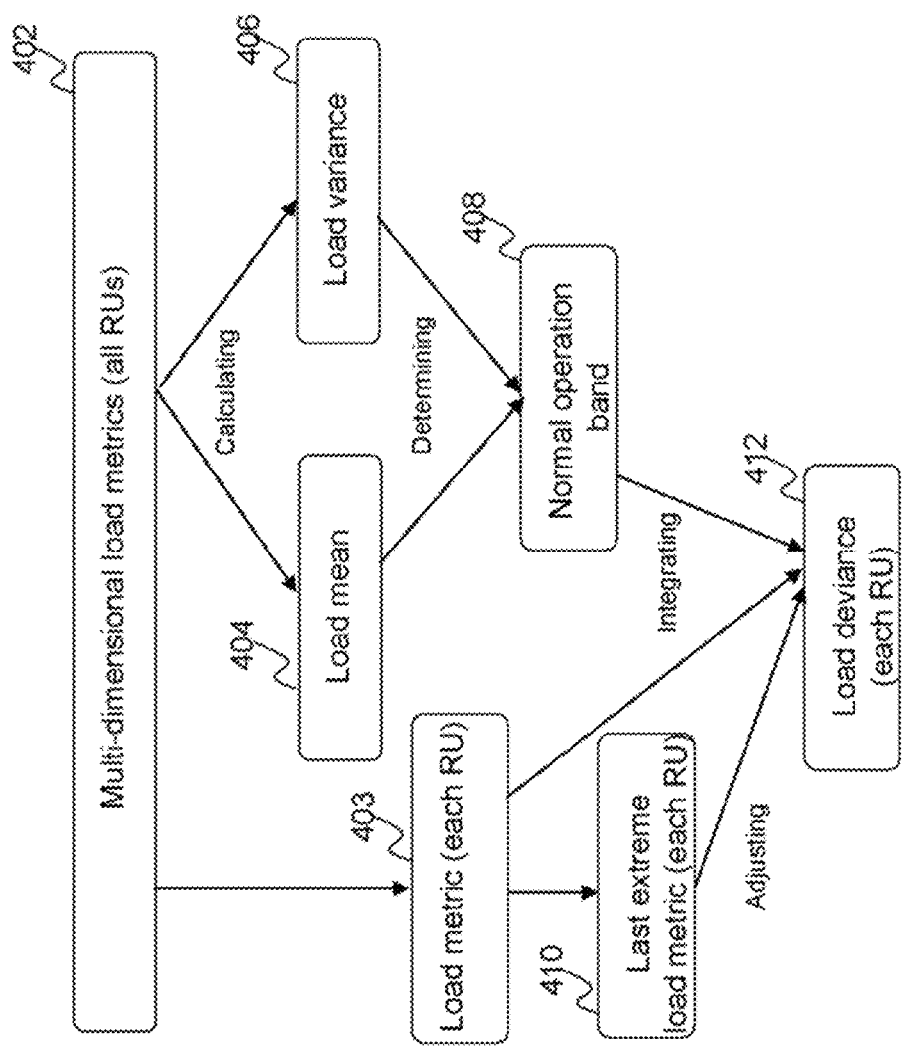
FIGS. 4(a)-(c) are depictions of exemplary global statistical load models in the system for balancing work load in a distributed system, according to different embodiments of the present teaching.

FIG. 4(a) illustrates one exemplary global statistical load model based on load mean and load variance. In this example, in computing the load deviance for each resource unit, the computation module 304 is configured to calculate a load mean 404 and a load variance 406 of the distributed system 104 based on the received plurality of multi-dimensional load metrics 402 (cluster-wide load data). Each multi-dimensional load metric 403 for one resource unit u may be represented by $L_u(t)$ as a function of time t. The load mean 404 and load variance 406 may be represented by functions $\text{MEAN}_F(L_u(t))$ and $\text{VAR}_F(L_u(t))$, respectively, over all resource units in a given cluster 104 over some window of time $\Delta t$. As noted above, the window of time $\Delta t$ is a configurable model parameter and may be determined as part of the configuration information provided by the operator 106. In one example, the window of time $\Delta t$ may be 5 minutes. The load mean 404 and load variance 406 may be calculated using some kind of decay model to dampen out variations over short periods of time. It is understood that, in other examples, a different time interval and/or decay model may be implemented to compute the load mean 404 and load variance 406. It is also understood that, the time interval for sampling may not be predetermined or fixed in other examples. In those examples, the sensing module 302 may passively receive the load data and record the last time the data arrives. As such, the sensing module 302 may calculate each individual time difference and use it as the time interval for the analysis performed by the dynamic load controller 204. In other words, in those examples, the time window may vary from time to time, depending on how fast or slow the load data arrives.

Next, in this example, the computation module 304 is further configured to determine a normal operation band (NoB) 408 based on the calculated load mean 404 and load variance 406. NoB 408 is a band of load variation for which the dynamic load controller 204 may not take any load balancing action. In this example, NoB 408 may be defined based on the cluster-wide load mean 404 and load variance 406, using $2c_l$ to indicate the width of the band in units of variance.

$$NoB=(MEAN_F-c_l \cdot VAR_F, MEAN_F+c_l \cdot VAR_F) \qquad (2).$$

$MEAN_F+c_l \cdot VAR_F$ is the upper bound of the band. Any resource units that have a particular load metric above the upper bound have high load value (overload). Similarly, $MEAN_F-c_l \cdot VAR_F$ is the lower bound of the band. Any resource units that have a particular load metric below the lower bound have low load value (underload). In one example, NoB 408 may be determined by the Gaussian distribution. For example, if $c_l$ equals to 1, then the band covers 68.26% of cases closest to the load mean 404. This choice allows the operator 106 to select $c_l$ and associate an actual meaning to it.

Further, in this example, the computation module 304 is configured to determine a load deviance 412 for each of the plurality of resource units based on NoB 408 and a last extreme load metric 410 of the respective resource unit a observed in the window of time $\Delta t$. In order to prevent actions that are too hasty, the load deviance 412 is calculated for any given resource unit as a measure of persistence in operating outside NoB 408. For overloaded resource units, the calculation of load deviance 412 is as follows:

$$OverLoad_{u+}=\Delta t \cdot (L_u(t)-(MEAN_F+c_l \cdot VAR_F))+\Delta t \cdot (L_u(t)-Max(L_u)) \cdot (1-sign(L_u(t)-L_u(t-\Delta t)))/2 \qquad (3).$$

Where the term $Max(L_u)$ refers to the last maximum load metric of $L_u(t)$ of a resource unit u received by the sensing module 302. The computation module 304 continuously determines a load deviance 412 for each resource unit. Thus, if a resource unit returns to NoB 408 before this last inequality condition is satisfied, the computation module 304 may stop calculating $OverLoad_{u+}$ for that resource unit. For resource units that go below NoB 408, a similar, complementary calculation may be performed as follows:

$$UnderLoad_{u+}=\Delta t \cdot (L_u(t)-(MEAN_F-c_l \cdot VAR_F))+\Delta t \cdot (L_u(t)-MIN(L_u)) \cdot (1+sign(L_u(t)-L_u(t-\Delta t)))/2 \qquad (4).$$

Where the term $Min(L_u)$ refers to the last minimum load metric, of $L_u(t)$ of a resource unit u received by the sensing module 302.

The above calculations can be done for all resource units and an ordering among them can be created by its results. A single equation can perform both calculations in one expression as follows:

$$LoadDeviance_u=(1+sign((L_u(t)-(MEAN_F+c_l \cdot VAR_F)))OverLoad_{u+}/2+(1-sign((L_u(t)-(MEAN_F-c_l \cdot VAR_F)))UnderLoad_u/2 \qquad (5).$$

Figure 10:
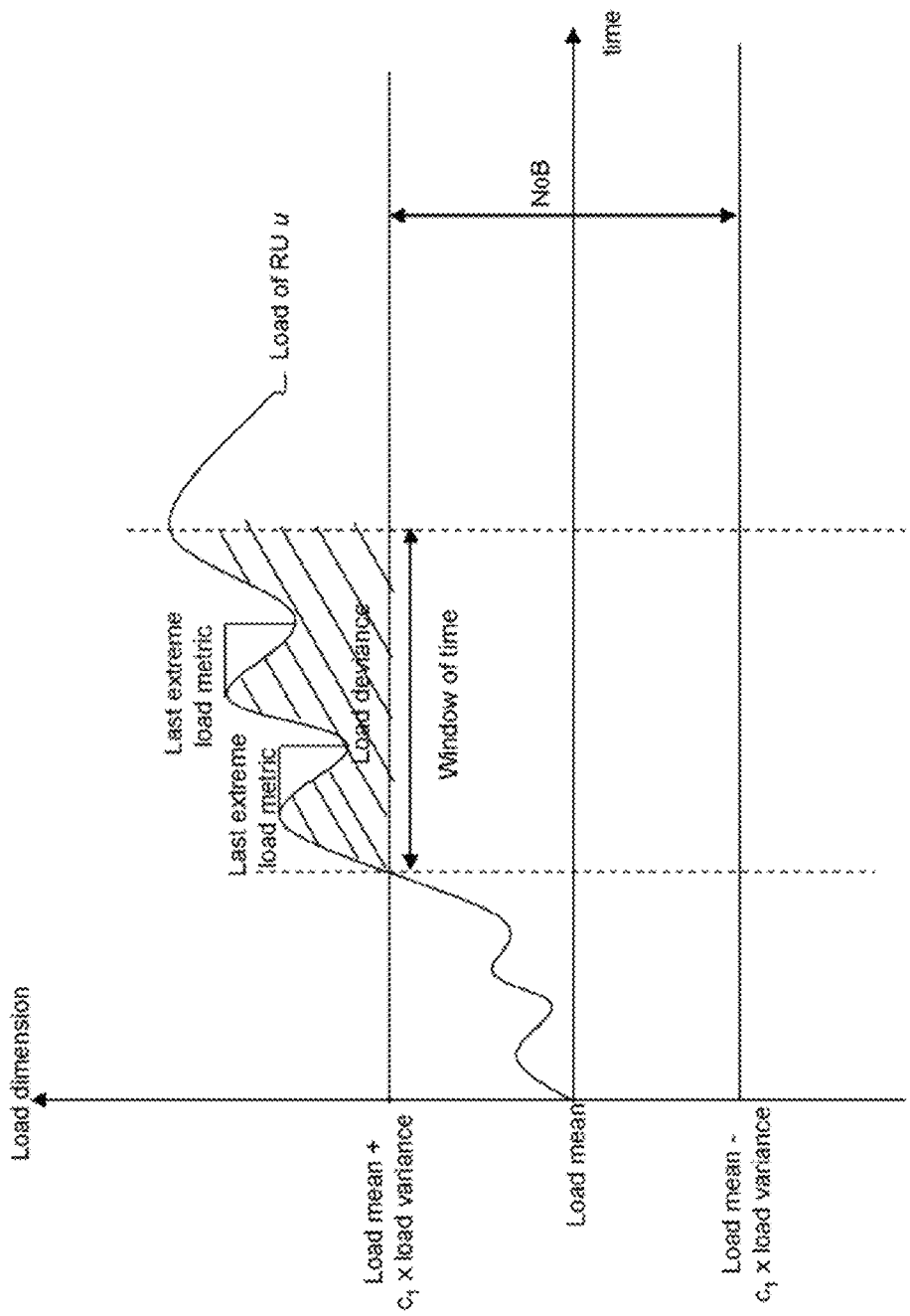
FIGS. 10(a) and (b) depict examples of computing a load deviance for a resource unit in a distributed system, according to different embodiments of the present teaching.
Figure 10:
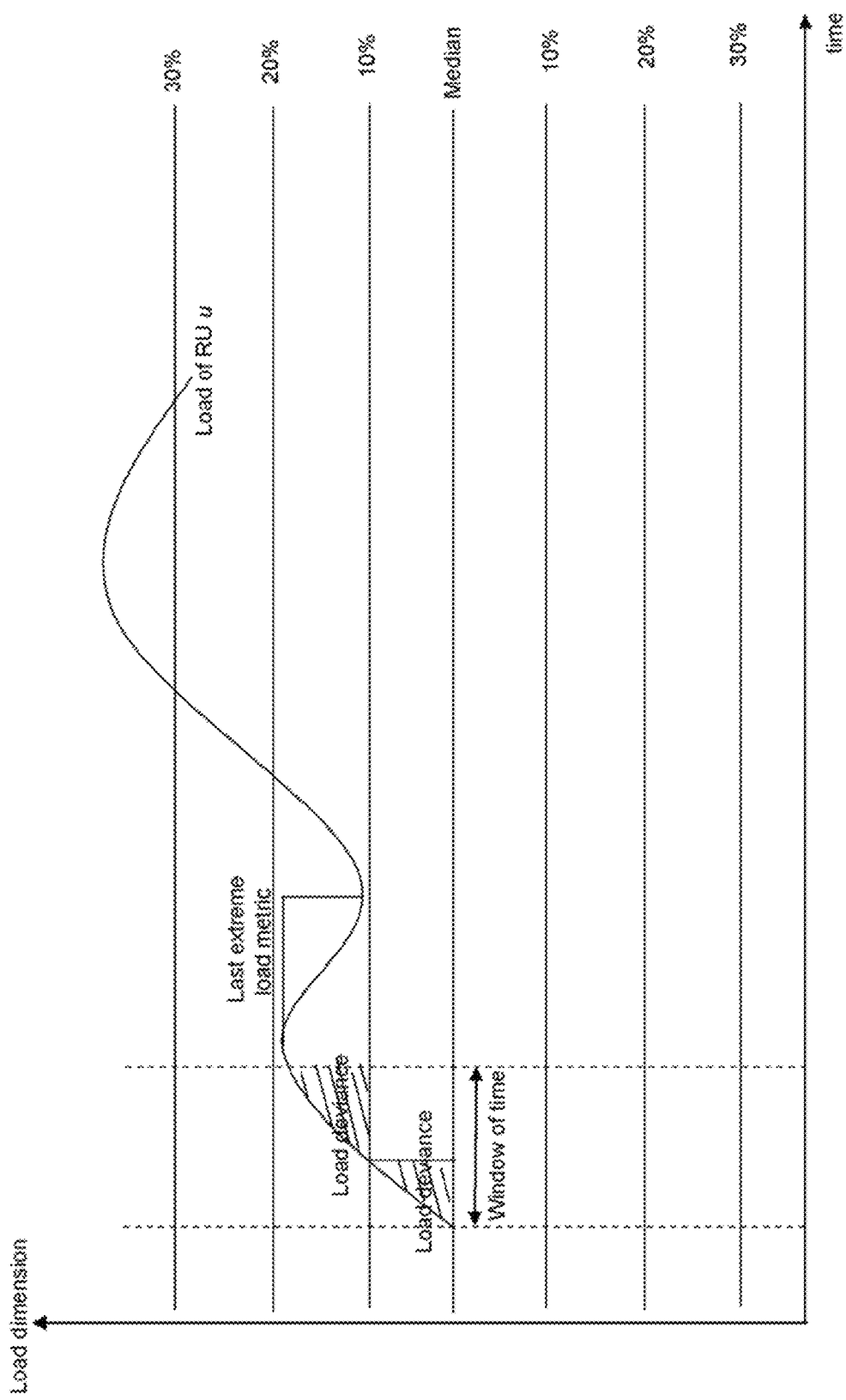

FIG. 10($a$) further illustrates one example of determining a load deviance for a resource unit based on NoB and a last extreme load metric of a resource unit. The load metric in one dimension of a resource unit it changes with respect to time. In a given sampling time window, the shaded area above the base line defined by the load mean, load variance, and model parameter $c_l$ is computed by integration, which corresponds to $\Delta t \cdot (L_u(t)-(MEAN_F+c_l \cdot VAR_F))$ in Equation (3). As noted above, the computation module 304 keeps track of the last-observed extreme value of the load metric for each resource unit and uses the last extreme load metric as a "differential reward" for adjusting the integral area to obtain the load deviance. The differential reward adjustment applies to resource units that shed load on their own or lose load through other processes (such as fewer client requests) in order to prevent them from being tagged for a load balancing action too early. Knowing the last extreme value is the same as knowing the average differential of load since the last such observation of such minima or maxima. The differential reward adjustment corresponds to $\Delta t \cdot (L_u(t)-Max(L_u)) \cdot (1-sign(L_u(t)-L_u(t-\Delta t)))/2$ in Equations (3) above. Although FIG. 10($a$) shows an example of an overloaded resource unit, it is understood that the same idea can be applied to underloaded resource units in view of Equations (4) above. From control theory perspective, the exemplary global statistical load model shown in FIGS. 4 and 10($a$) may be viewed as an improved proportional-integral-derivative (PID) controller, where NoB (baseline) represents the proportional aspect, the integral shaded area represents the integral aspect, and the differential reward adjustment represents the derivative aspect of the classical PID controller.

Figure 4:
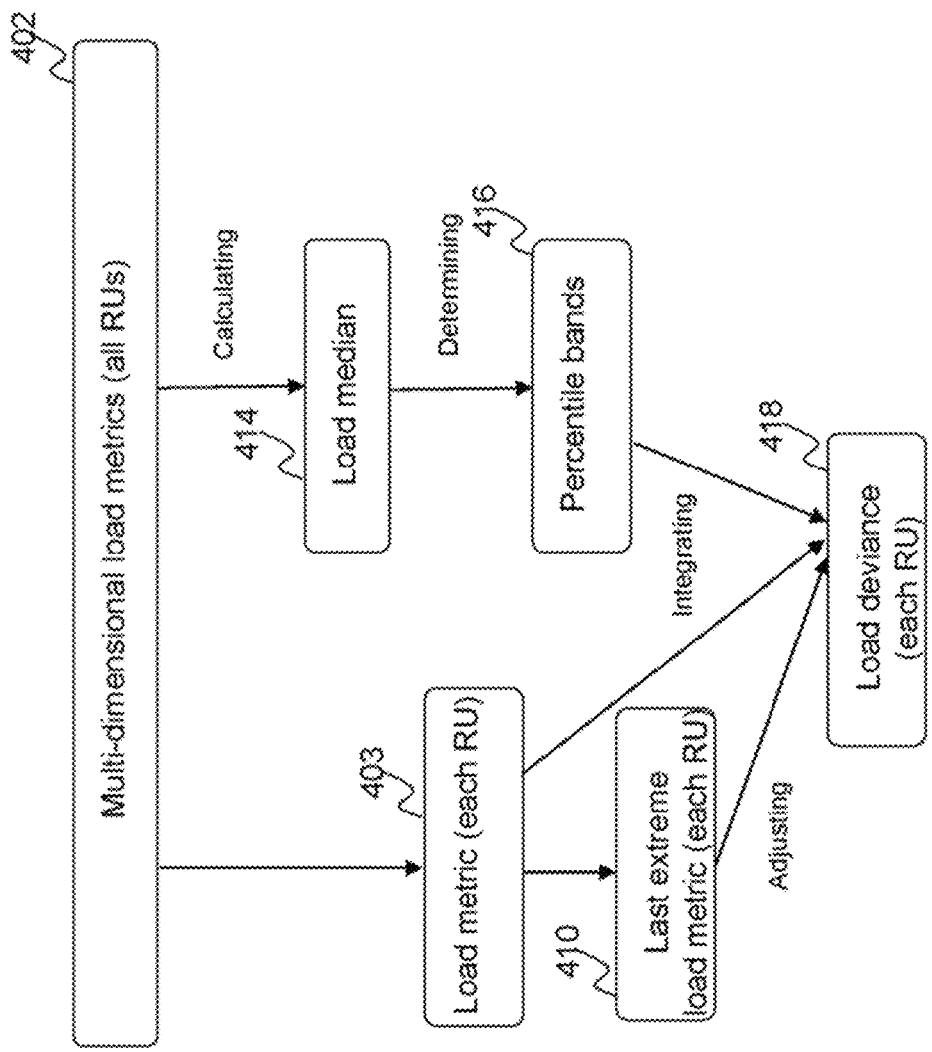
Figure 4:
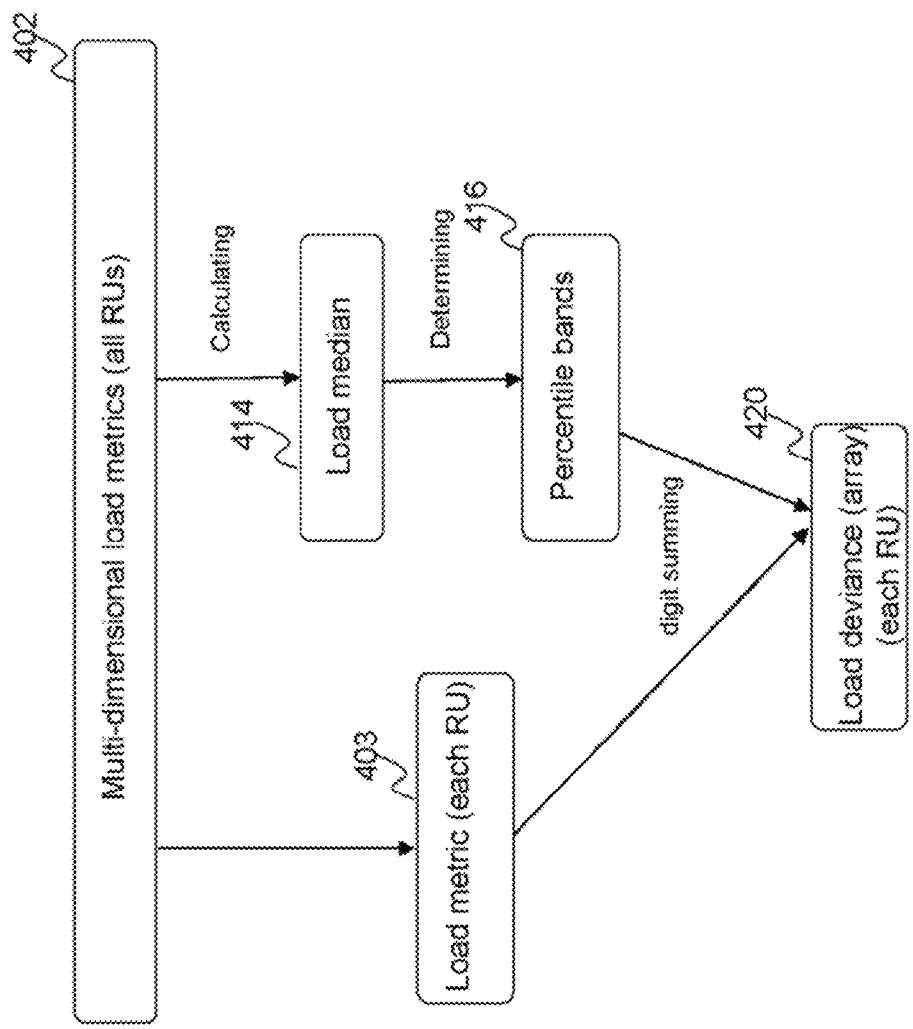

FIG. 4($b$) illustrates another exemplary global statistical load model based on load median. In this example, in computing the load deviance for each resource unit, the computation module 304 is configured to calculate a load median 414 of the distributed system 104 based on the received plurality of multi-dimensional load metrics 402 (cluster-wide load data). The computation module 304 is further configured to determine a plurality of percentile bands 416 based on the calculated load median 414 using approaches such as population analysis. Referring now the FIG. 10($b$), for example, percentile bands may be defined by the calculated load median and 10% percentile lines. It is understood that the width of each percentile band and the total number of percentile bands may vary in other examples. Referring back to FIG. 4($b$), in this example, the computation module 304 is configured to determine a load deviance 418 for each of the plurality of resource units based on at least some of the percentile bands 416 and a last extreme load metric 410 of the respective resource unit observed in the sampling time window.

FIG. 10($b$) illustrates one example of determining a load deviance for a resource unit based on percentile band and the last extreme load metric of the resource unit. Instead of using NoB determined by load mean and load variance as the base line for integration, in this example, the percentile bands are used to calculate the load integrals with respect to each percentile line (percentile boundary) in the time window. Separate integrals may be calculated for each percentile band for a given resource unit. Thus, the determined load variance for each resource unit in this example may be represented by a vector having multiple elements, each representing one integral value from one percentile band. Alternatively, the load median (0 percentile line), instead of each percentile line, may be used as a common base line for integration in other examples. In those examples, instead of getting a vector, the load deviance may be represented as a single value for each resource unit. Nevertheless, similar to the example in FIG. 10($a$), the computation module 304 keeps track of the last-observed extreme value of the load metric for each resource unit and uses the last extreme load metric 410 as a "differential reward" for adjusting the integral area(s) to obtain the load deviance.

FIG. 4($c$) illustrates still another exemplary global statistical load model based on load median. In this example, in computing the load deviance for each resource unit, the computation module 304 is configured to calculate a load median 414 of the distributed system 104 based on the received plurality of multi-dimensional load metrics 402 (cluster-wide load data). The computation module 304 is further configured to determine a plurality of percentile bands 416 based on the calculated load median 414 using approaches such as population analysis. Referring now the FIG. 10(b), for example, percentiles bands may be defined by the calculated load median and 10% percentile lines. Referring back to FIG. 4(c), in this example, the computation module 304 is configured to determine a load deviance 420 for each of the plurality of resource units based on at least some of the percentile bands 416 using a digit summation approach. Different from the example in FIGS. 4(b) and 10(b) where each element in the vector is an "accurate" estimate of the area occupied by the load graph in a percentile band (with differential reward adjustment), in this example, the value of each element is an integer that is incremented every time the load dimension is found within that band (without differential reward adjustment). It is understood that, however, as the number of percentile bands increases, the difference in information content between the examples in FIGS. 4(b) and 4(c) may gradually disappear.

In this example, instead of using integrals adjusted by differential rewards as shown in FIGS. 4(a) and 4(b), a load percentile array, including a plurality of elements, is determined by incrementing an array element based on a percentile band into which the load dimension falls. For example, a load percentile array ($e_l$, $e_1$, $e_2$, $e_3$, $e_4$, $e_5$, $e_6$, $e_7$, $e_8$, $e_h$) may include eight elements $e_1$ to $e_8$ corresponding to −40%, −30%, −20%, −10%, 10%, 20%, 30%, and 40% percentile bands, respectively, and two elements $e_l$ and $e_h$ corresponding to lower and higher bands capturing the long tails. It is understood that the width of each percentile band and the total number of percentile bands may vary in other examples, so may the number of elements in the load percentile array. Depending on where the load metric of the resource unit resides in the sampling tune window, the corresponding element value in the load percentile array is incremented. In other words, digit summation approach may be applied to determine the load percentile array. In one example, if the load metric of a resource unit is in the 40% band, then $e_8$ is incremented $e_8=e_8+1$; if the load metric of the resource unit changes to the −40% band, then $e_1$ is incremented $e_1=e_1+1$. In this example, the load percentile array may be used as the load deviance for each resource unit to determine the appropriate load balancing action.

Referring back to FIG. 3, in this example, the ranking module 306 is operatively coupled to the computation module 304. The ranking module 306 is configured to rank a plurality of resource units in the distributed system based a plurality of multi-dimensional load metrics determined from each of the plurality of resource units. As the load deviance of each resource unit has been determined by the computation module 304, the ranking module 306 in this example ranks the resource units in the distributed system 104 based on the load deviances. As noted above, in each load dimension, the load deviance may be determined in the form of a single value or a vector/array depending on the selected global statistical load model. In one example, if the load deviance is represented as a single value, the value may be used to rank the resource units. In another example, if the load deviance is represented as a vector/array having, multiple elements, the ranking may be based on each element of the vector/array or based on composite ordering of some or all elements in the vector/array (a weight may be applied to each element in the vector/array in composite ordering). As the load deviance may be determined for a particular load dimension, each load metric dimension may be independently ranked, including a first load ranking based on a first load metric dimension, e.g., disk usage, and a second load ranking based on a second load metric dimension, e.g., latency. In one example, the same resource unit may be ranked differently based on different load metric dimensions, and certain resource units may not exist in a particular ranking if a corresponding load metric dimension is not applicable. In another example, the independent rankings may be transferred into a single ranking using approaches such as single value decomposition approach if needed. In ranking the plurality of resource units in the distributed system 104, the ranking module 306 may be configured to remove any resource unit that was previously applied to a load balancing action within a predetermined time period (cooling period) from the ranking. The cooling period allows resource unit metrics to stabilize before considering it for another balancing action. Optionally, the ranking module 306 may also ignore resource units that were recently rebooted, or if they report stale data.

Figure 12:
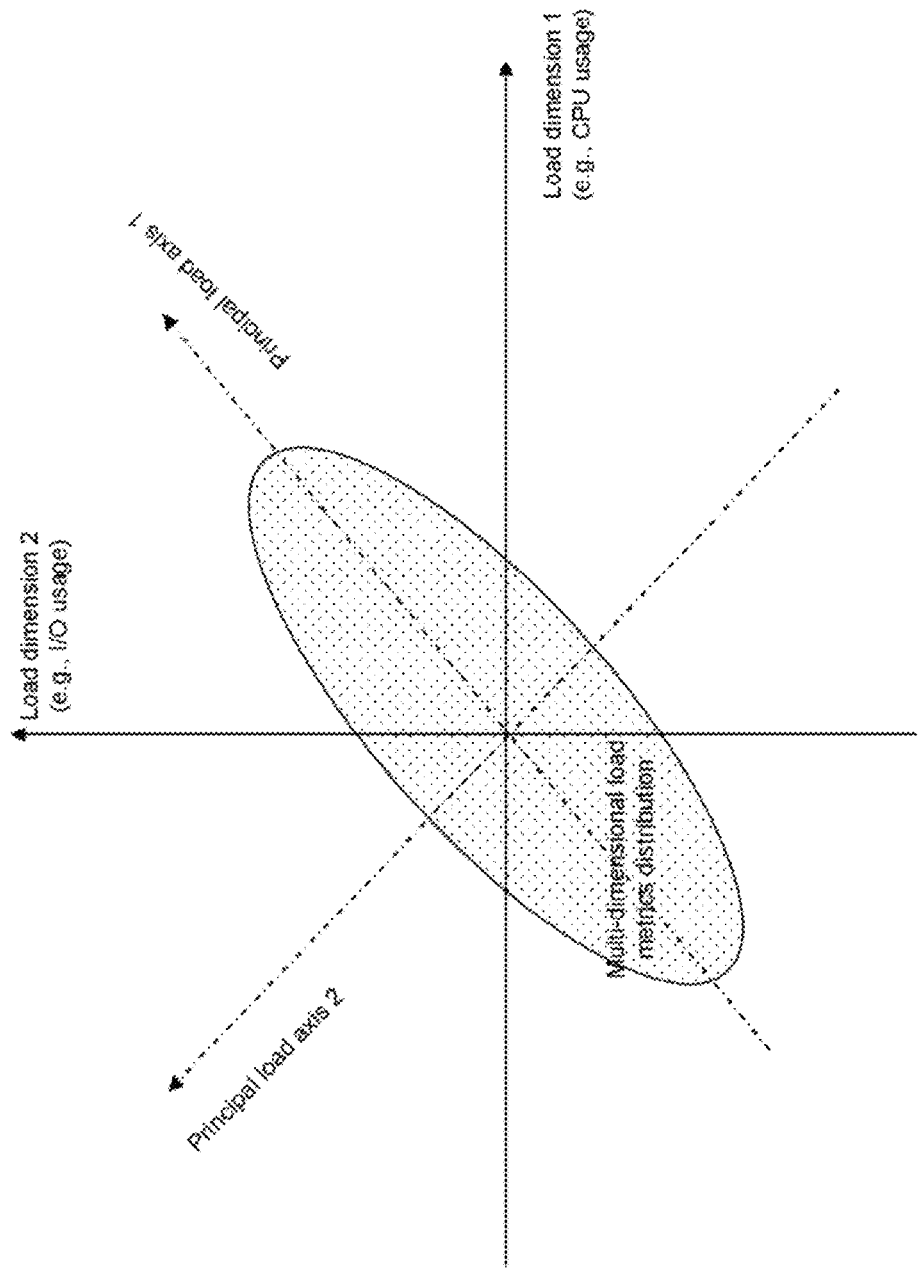
FIG. 12 depicts an example of determining one or more principal load axes based on a distribution of a plurality of multi-dimensional load metrics in a distributed system, according to an embodiment of the present teaching.

Additionally or optionally, the computation module 304 may be further configured to determine one or more principal load axes based on a distribution of the plurality of multi-dimensional load metrics, and the ranking module 306 may be further configured to rank the plurality of resource units in the distributed system 104 based on the one or more principal load axes and the plurality of multi-dimensional load metrics. FIG. 12 illustrates one example of how to determine the principal load axes. In this example, the multi-dimensional load metrics include two load dimensions: CPU usage and I/O usage for each resource unit. The distribution of the multi-dimensional load metrics of the resources units may be reflected in a coordinate system defined by the two load dimensions as X and Y axes (original load metric axes). In this example, two principal load axes may be derived by techniques such as latent factor analysis, regression fitting, principal vector analysis, etc., based on the multi-dimensional load data distribution. A new coordinate system may be defined by the derived principal load axes for ranking the resource units based on the load deviance calculated using any of the global statistical models noted above or based on the multi-dimensional load metric of each resource unit. It is understood that, the dimensions of the load metrics may be less than or more than two and thus, the number of derived principal load axes may be also less than or more than two in other examples. Using principle load axis, rather than original load metric axis, may be more effective for ranking and load balancing in high dimensional load systems.

Figure 5:
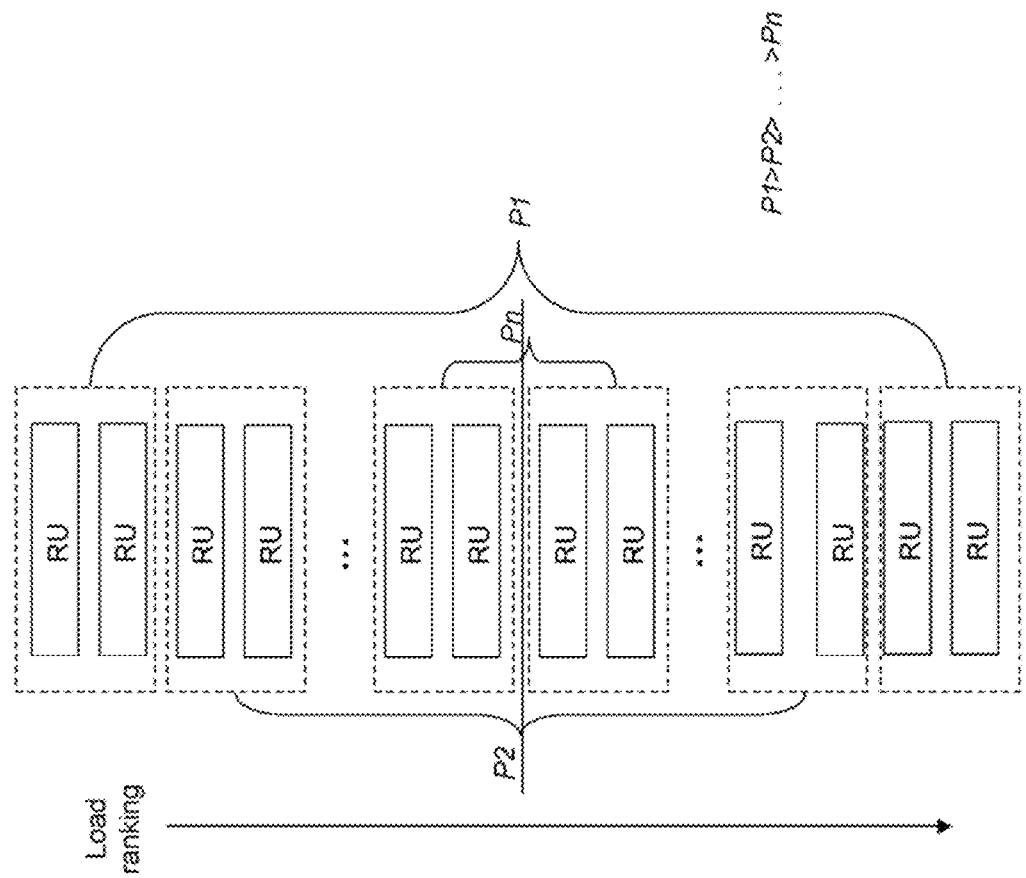
FIG. 5 is a depiction of an exemplary resource units ranking with pairs of resource unit groups, according to an embodiment of the present teaching.

Referring back to FIG. 3, the ranking module 306 is further configured to divide the plurality of resource units into a plurality of resource unit groups based on the ranking of the plurality of resource units. For example, the resource units in the same group have the similar load deviance if the ranking is determined based on the computed load deviances. As shown in FIG. 5, adjacent two resource units in the load ranking may be assigned into one resource unit group. In one extreme example, each resource unit group may include only one resource unit. In another extreme example, all the resource units in the load ranking may be divided into two resource unit groups. In one example, regardless of the total number of resource unit groups, the number of resource units in each group is the same. For example, all the resource units in the load ranking may be evenly divided into two resource unit groups from the middle of the ranking. That is, the top half of resource units in the ranking are assigned into an overload group (pool), and the bottom half of resource units in the ranking are assigned into an underload group (pool). It is understood that, in other examples, the number of resource units in each resource unit group may be different.

Referring hack to FIG. 3, in this example, the action module 308 is operatively coupled to the ranking module 306. The action module 308 is configured to form a plurality of pairs of resource unit groups. Each pair of resource unit groups is assigned with a probability of load balancing action. As shown in FIG. 5, for each pair of resource unit groups, a first resource unit group is selected from the top half of resource unit groups in the ranking, and a second resource unit group is selected from the bottom half of resource unit groups in the ranking. In other words, a set of overloaded resource units and a set of underloaded resource units form a pair of resource unit groups. In one example as shown in FIG. 5, a relative position of the first resource unit group with respect to the middle of the ranking is the same as that of the second resource unit group with respect to the middle of the ranking. That is, quintile grouping is performed by the ranking module 306 in conjunction with the action module 308. For example, the top-most resource unit group in the ranking and the bottom-most resource unit group in the ranking, may form one pair of resource unit groups, which may correspond to the top and bottom 10% of resource units in the load ranking, respectively. In other words, in each pair of resource unit groups, the distances along the control metric (dimension) of each resource unit groups are the same. The zero point of the control metric is the middle of the load ranking.

In this example, probabilities (P) of load balancing actions are different from each other among different pairs of resource unit groups. The probability of load balancing action assigned to each pair of resource unit groups is determined based on the relative positions the degree of overloading/underloading). For example, a shown in FIG. 5, the probability of load balancing action decreases as the relative position gets closer to the middle of the ranking (P1>P2> . . . Pn). That is, the probability assignment of a load balancing action may approach zero as its distance along the control metric approaches zero. The farther the distance is, in the quintile groups, the more likely of a load exchange occurs between the pair of resource unit groups. For the pair of resource units that has the largest distance, i.e., the top-most and bottom-most resource unit groups in the ranking, the assigned probability may be 1, meaning that a load balancing action, e.g., load exchange, always occurs between this pair of resource unit groups.

In this example, the action module 308 is further configured to, for each pair of resource unit groups, determine a load balancing action based on the assigned probability of load balancing action. As noted above, the load balancing action includes, for example, exchange work between two resource units or resource unit groups (load exchange), assigning work (load-quanta) to a resource unit, re-assigning work from one resource unit to another resource unit, splitting work among a plurality of resource units (e.g., re-partitioning data), and keeping the current work assignment (no further action).

Figure 6:
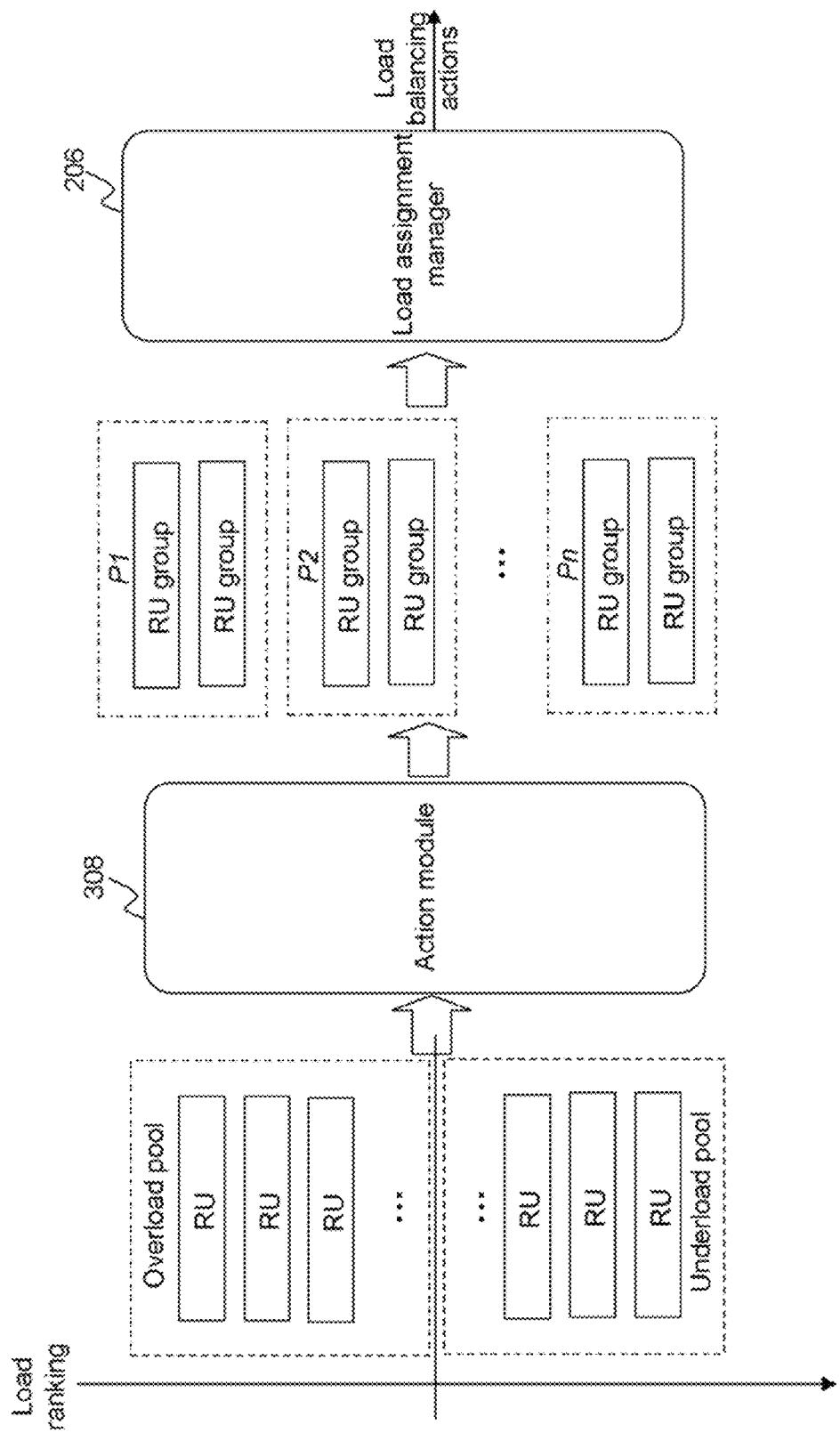
FIG. 6 is a depiction of an exemplary ranking module, action module, and load assignment manger of the system for balancing work load in a distributed system, according to an embodiment of the present teaching.

As shown in FIG. 6, the action module 308 may form a plurality of pairs of resource unit groups and assign a probability to each pair based on their relative positions with respect to the middle of the ranking (i.e., distance along the metric). A load balancing action is determined based on the assigned probability for each pair of resource unit groups. In this example, the load balancing action may be load exchange between the pair of resource unit groups. As the pair of resource unit groups on the top and bottom of the ranking is assigned with the highest probability (e.g., P1=1), load exchange always occurs between these two resource unit groups. On the other hand, as the pair of resource unit groups closest to the middle of the ranking is assigned with the lowest probability (e.g. close to zero), load exchange rarely occurs between these two resource unit groups. The load assignment manager 206 in this example is configured to perform the determined plurality of load balancing actions in parallel for each pair of resource unit groups.

Figure 11:
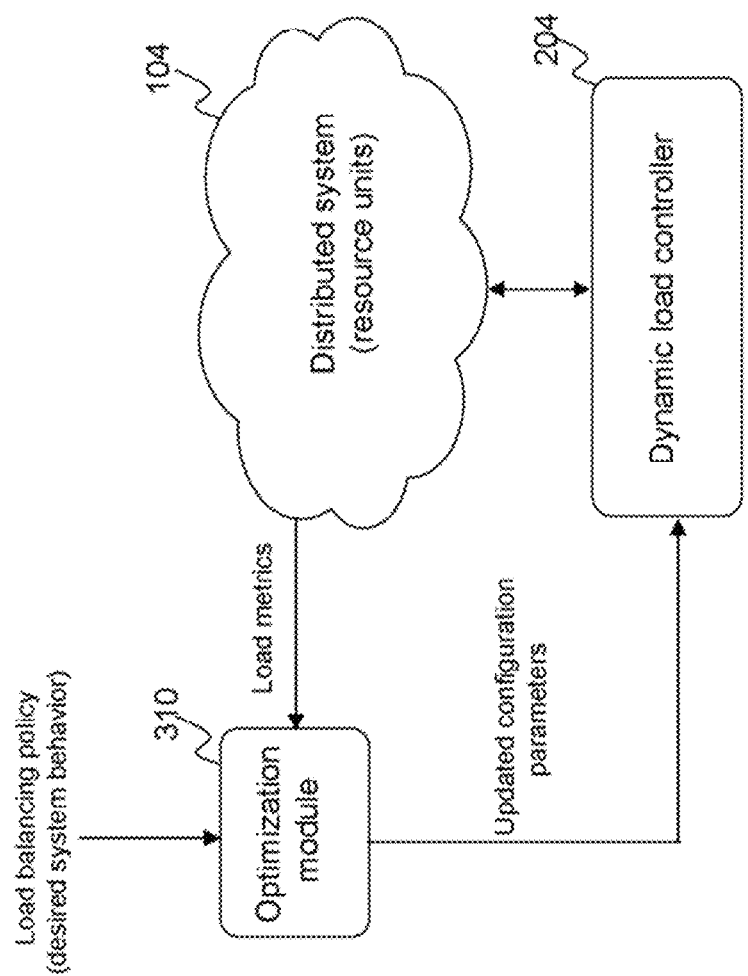
FIG. 11 is a depiction of an exemplary optimization module of the system for balancing work load in a distributed system, according to an embodiment of the present teaching.

Referring back to FIG. 3, in this example, the dynamic load controller 204 may further include an optimization module 310 operatively coupled to the sensing module 302, the computation module 304, the ranking module 306, and the action module 308. The optimization module 310 is configured to optimize the global statistical load model by updating the configuration parameters of the global statistical load model based on the received plurality of multi-dimensional load metrics and a load balancing policy. The optimization module 310 may apply an automatic mechanism to learn and/or search for the optimal values of various configuration parameters such as model parameters $c_1$, $c_2$, and W, load metric collection frequencies, and paramedic smoothing factors. In one example as shown in FIG. 11, in reinforcement learning, the load metrics of the distributed system 104 and the balancing policy are combined with a feedback loop related to the objective functions of the load balancing policy. In order to learn optimal configuration parameters, desirable system behavior with respect to the objective functions of the load balancing policy may be determined and applied to the optimization module 310. The desirable system behavior includes, for example, availability and number of service level agreement (SLA) misses across the installation under control. Some initial values of the model parameters may be selected based on the physical meaning of these parameters, as given in the exemplary global statistical load models noted above. Over time, updated configuration parameters may be set in order to move the system towards the desirable system behavior. One metric may be necessary is the "distance" to the desirable system behavior. For example, the distance metric may be the load variance as a fraction of the load mean vs the same, earlier, or difference between load variance as a fraction of the load mean and the desired load variance as a fraction of the load mean. In one example, gradient descent techniques and the distance metric may be used to optimize and update the configuration parameters. It is understood that any other suitable optimization algorithm may be used by the optimization module 310 to discover more optimal configuration parameters.

Figure 7:
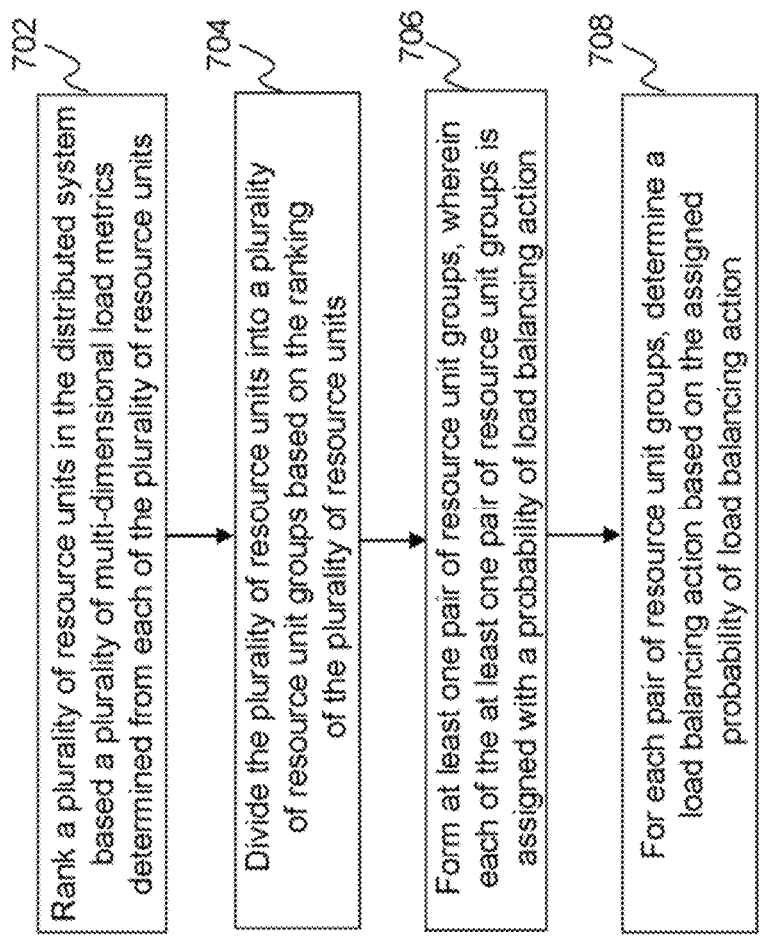
FIG. 7 is a flowchart of an exemplary process of balancing work load in a distributed system, according to an embodiment of the present teaching.

FIG. 7 is a flowchart of an exemplary process in which work load in a distributed system is balanced, according to an embodiment of the present teaching. It will be described with reference to FIG. 3. However, any suitable structure may be employed. Beginning at block 702, a plurality of resource units are ranked in the distributed system based a plurality of multi-dimensional load metrics determined from each of the plurality of resource units. For example, the ranking may be made based on the load deviance computed for each resource unit. At block 704, processing may continue where the plurality of resource units are divided into a plurality of resource unit groups based on the ranking of the plurality of resource units. As described above, blocks 702, 704 may be performed by the ranking module 306 of the dynamic load controller 204. At block 706, at least one pair of resource unit groups is formed. Each of the at least one pair of resource unit groups is assigned with a probability of load balancing action. Proceeding to block 708, for each pair of resource unit groups, a load balancing action is determined based on the assigned probability of load balancing action. As described above, blocks 706, 708 may be performed by the action module 308 of the dynamic load controller 204.

Figure 8A:
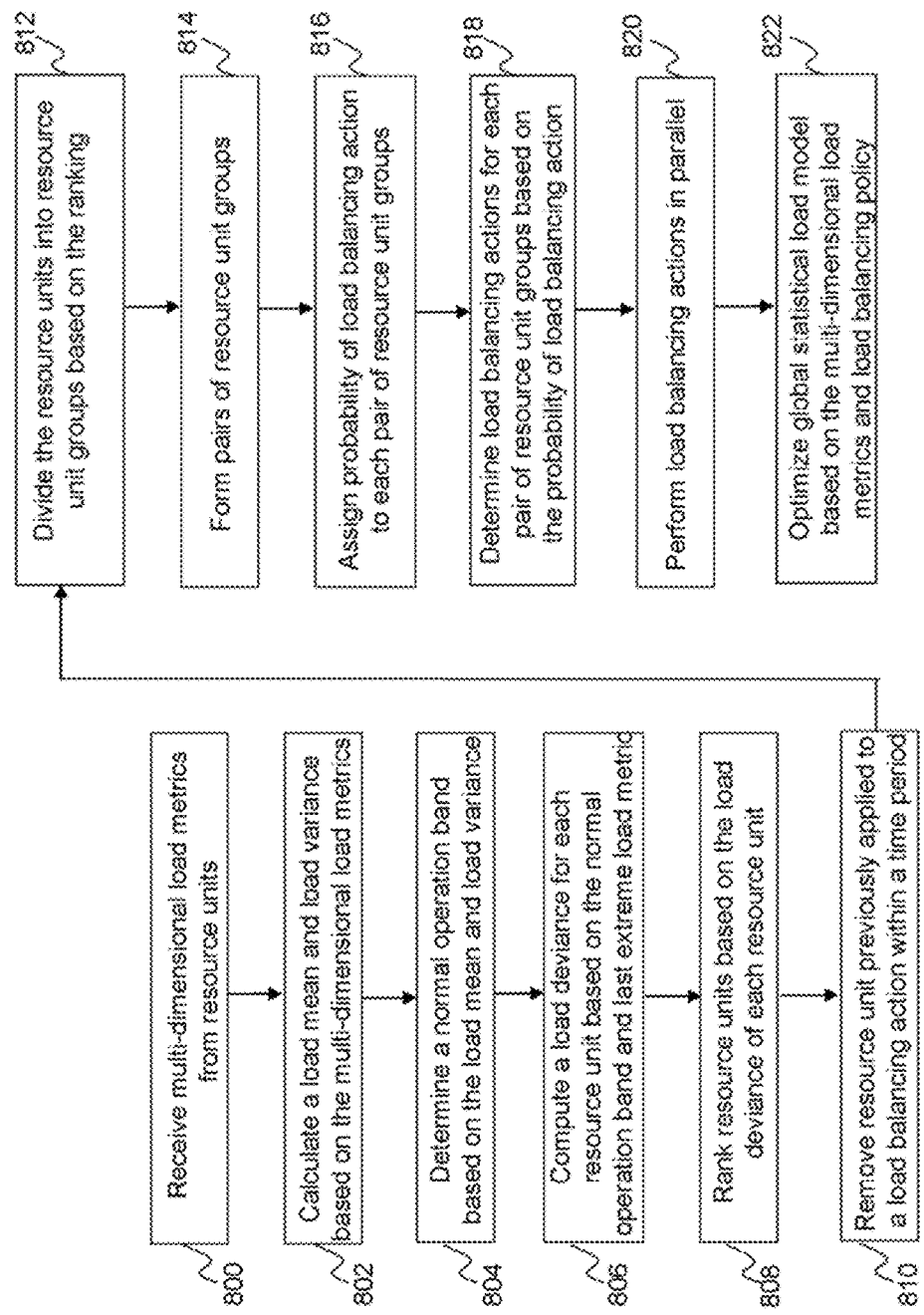
FIGS. 8(a)-(d) are detailed flowcharts of exemplary processes of balancing work load in a distributed system, according to different embodiments of the present teaching.
Figure 8B:
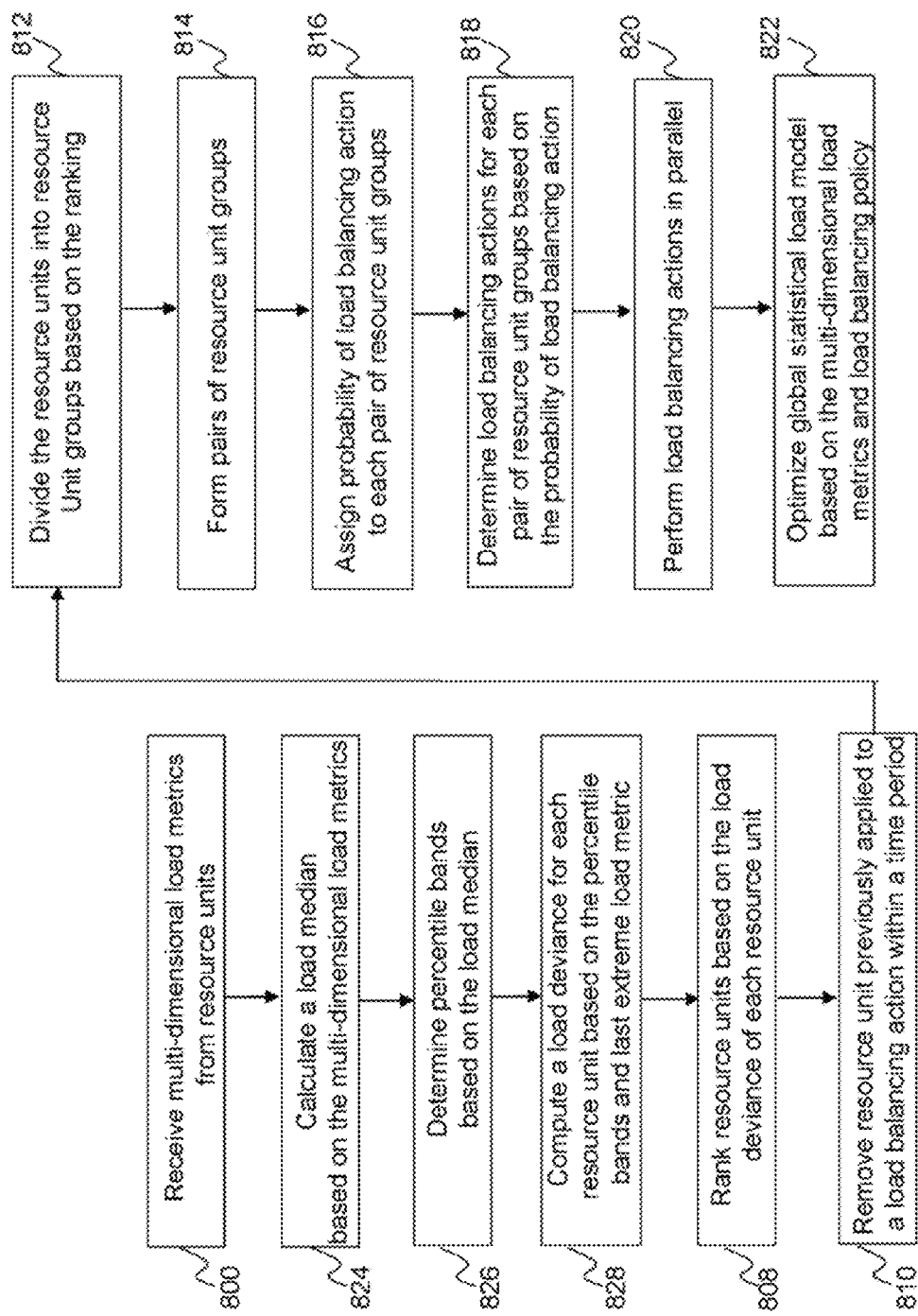

FIG. 8(a) is a detailed flowchart of one exemplary process in which the work load in a distributed system is balanced, according to an embodiment of the present teaching. It will be described with reference to FIG. 3. However, any suitable structure may be employed. Beginning at block 800, a plurality of multi-dimensional load metrics are received from a plurality of resource units in the distributed system. The plurality of multi-dimensional load metrics may include at least one of latency, query length, disk usage, processing unit usage, memory usage, input/output unit usage, network usage, and any combination thereof, each representing one dimension of load metrics. As described above, this may be performed by the sensing module 302 of the dynamic load controller 204. At block 802, processing may continue where a load mean and a load variance of the distributed system are calculated based on the received plurality of multi-dimensional load metrics. At block 804, a normal operation band is determined based on the calculated load mean and load variance. At block 806, for each resource unit, the load deviance is computed based on the normal operation band and a last extreme load metric of the resource unit. The global statistical model used in FIG. 8(*a*) is based on load mean and load variance as noted above in FIG. 4(*a*). As described above, blocks 802, 804, 806 may be performed by the computation module 304 of the dynamic load controller 204. Proceeding to block 808, the plurality of resource units in the distributed system are ranked based on the load deviance of each resource unit. At block 810, any resource unit that was previously applied to a load balancing action within a predetermined time period is removed. At block 812, resource units are divided into groups based on the ranking. As described above, blocks 808, 810, 812 may be performed by the ranking module 306 of the dynamic load controller 204. Proceeding to block 814, one or more pairs of resource unit groups are formed. At block 816, probability of load balancing action is assigned to each pair of resource unit groups. At block 818, load balancing actions are determined based on the assigned probability for each pair of resource units groups. As described above, blocks 814, 816, 818 may be performed by the action module 308 of the dynamic load controller 204. Proceeding to block 820, the determined load balancing actions are performed in parallel. The at least one load balancing action may include at least one of exchanging work between two resource units or resource unit groups, assigning work to a resource unit, re-assigning work from one resource unit to another resource unit, splitting work among a plurality of resource units, and keeping the current work assignment (no further action). As described above, this may be performed by the load assignment manager 206. Optionally, at block 822, the global statistical load model is optimized based on the received plurality of multi-dimensional load metrics and a load balancing policy. As described above, this may be performed by the optimization module 310 of the dynamic load controller 204.

Figure 8:
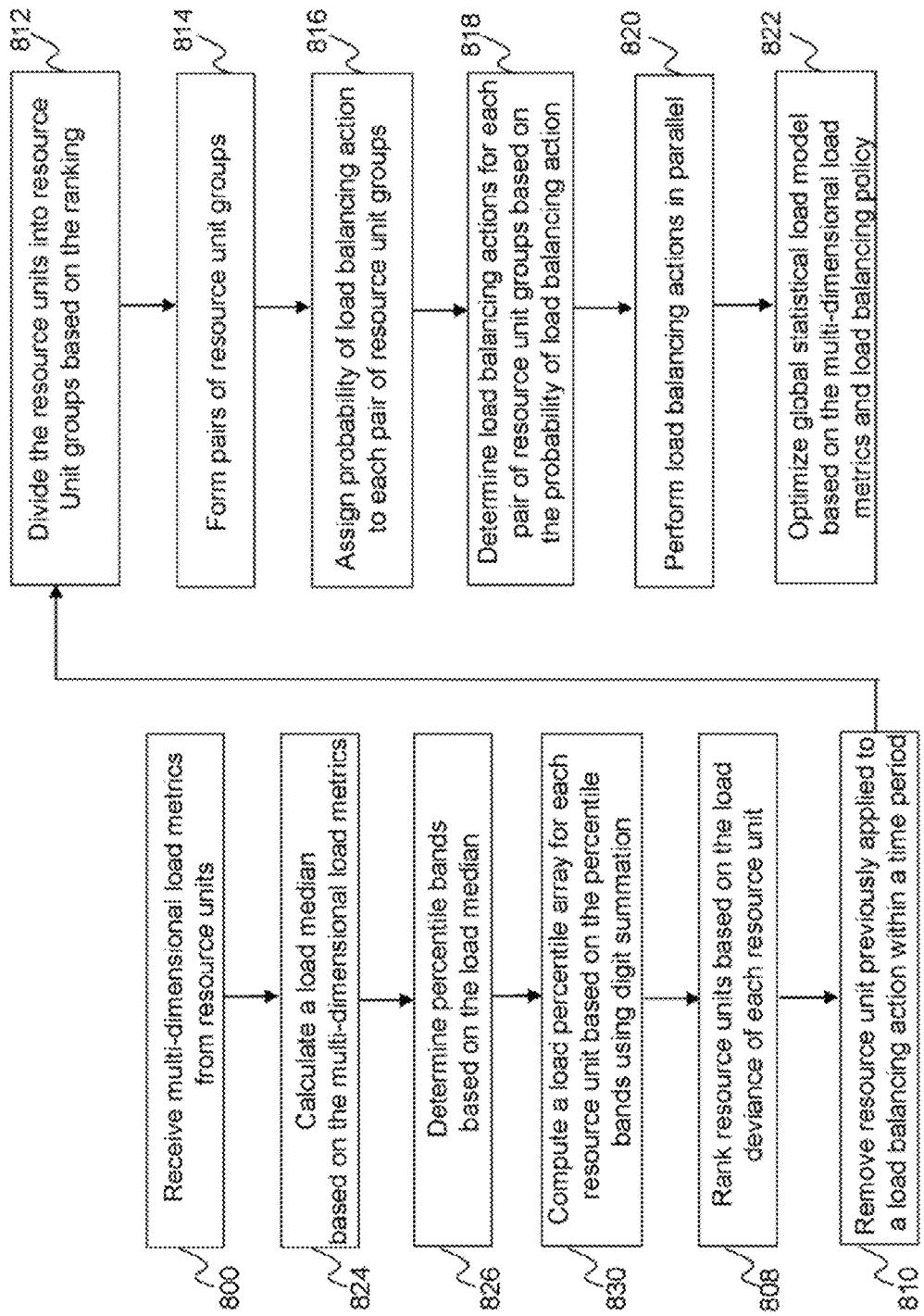
Figure 8D:
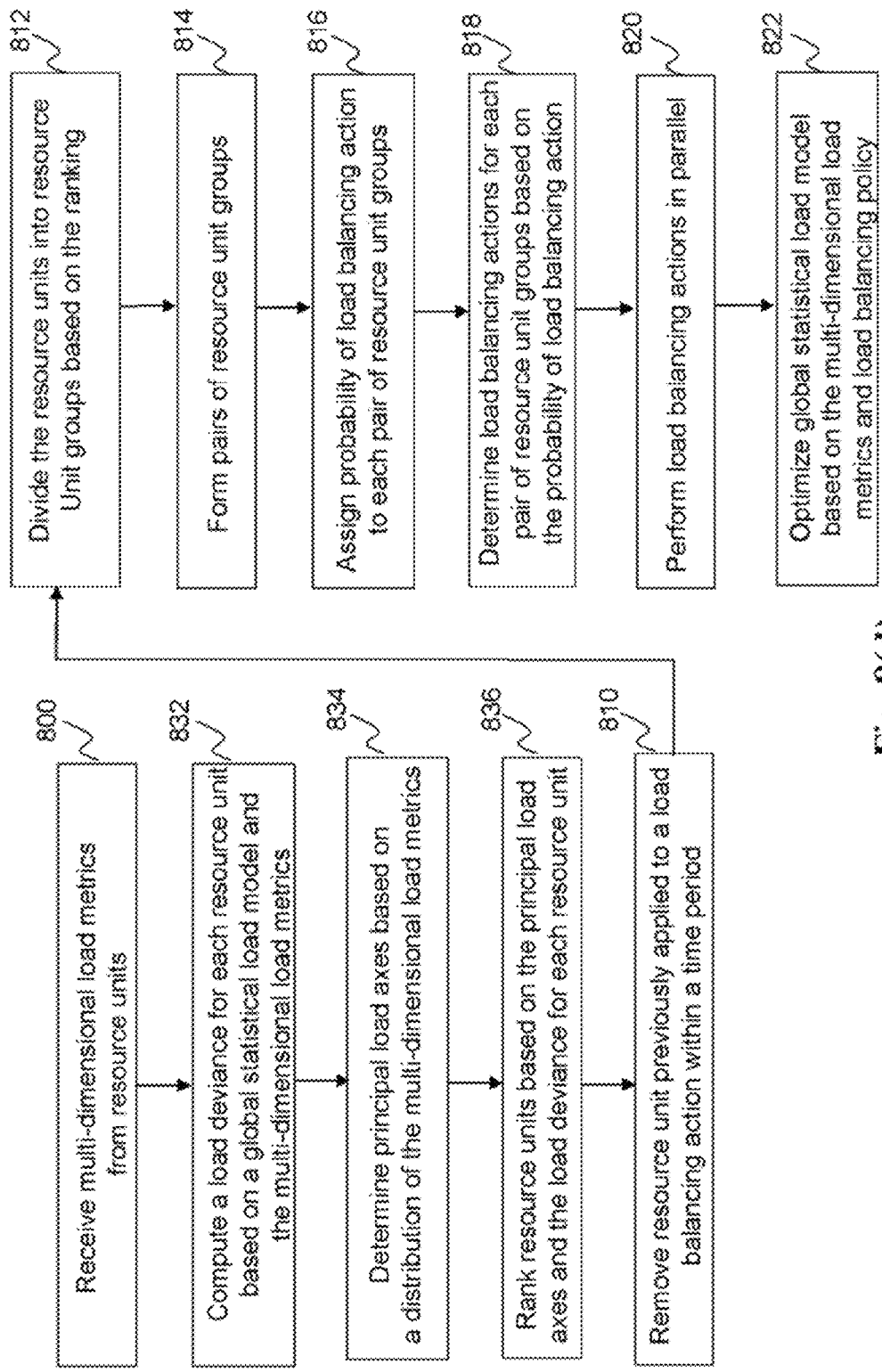

FIG. 8(*b*) is a detailed flowchart of another exemplary process in which the work load in a distributed system is balanced as what is shown in FIG. 8(*a*) except that blocks 802, 804, 806 are replaced with blocks 824, 826, 828 as FIG. 8(*b*) applies another global statistical model as shown in FIG. 4(*b*). At block 824, a load median of the distributed system is calculated based on the received plurality of multi-dimensional load metrics. At block 826, a plurality of percentile bands are determined based on the calculated load median. At block 828, for each resource unit, the load deviance is computed based on at least some of the plurality of percentile bands and a last extreme load metric of the resource unit. As described above, blocks 824, 826, 828 may be performed by the computation module 304 of the dynamic load controller 204.

FIG. 8(*c*) is a detailed flowchart of still another exemplary process in which the work load in a distributed system is balanced as what is shown in FIG. 8(*b*) except that block 828 is replaced with block 830 as FIG. 8(*b*) applies another global statistical model as shown in FIG. 4(*c*). At block 830, for each resource unit, the load deviance is computed based on at least some of the plurality of percentile hands using digit summation. The load deviance is a load percentile array. As described above, block 830 may be performed by the computation module 304 of the dynamic load controller 204.

FIG. 8(*d*) is a detailed flowchart of yet another exemplary process in which the work load in a distributed system is balanced as what is shown in FIG. 8(*a*) except that blocks 802, 804, 806, 808 are replaced with blocks 832, 834, 836. At block 832, a load deviance for each resource unit is calculated based on a global statistical load model and the multi-dimensional load metrics. At block 834, one or more principal load axes are determined based on a distribution of the plurality of multi-dimensional load metrics. As described above, blocks 832, 834 may be performed by the computation module 304 of the dynamic load controller 204. At block 836, the plurality of resource units in the distributed system are ranked based on the one or more principal load axes and the load deviance of each resource unit. As described above, this may be performed by the ranking module 306 of the dynamic load controller 204.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 9:
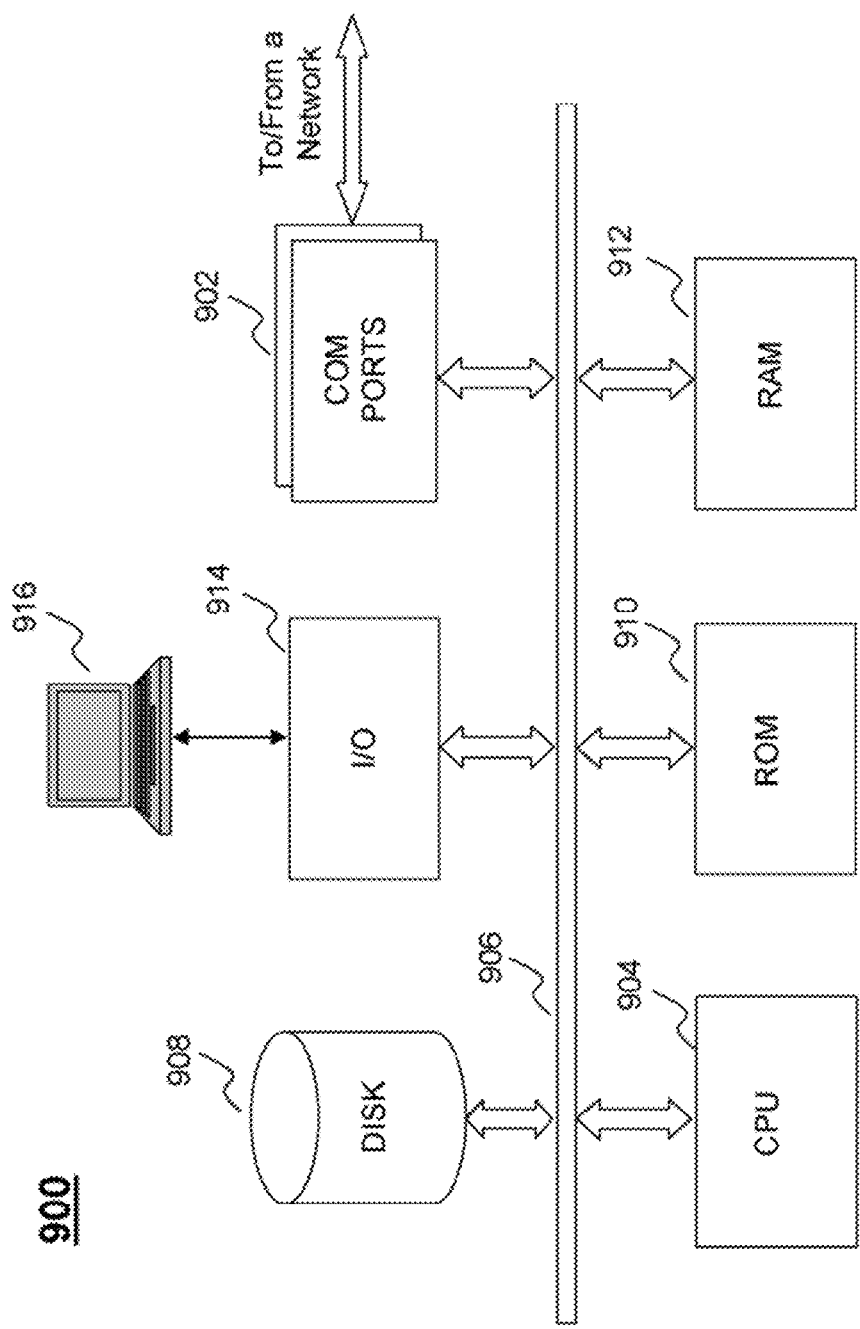
FIG. 9 depicts a general computer architecture on which the present teaching can be implemented.

FIG. 9 depicts a general computer architecture on which the present teaching can be implemented and has a functional block diagram illustration of a computer hardware platform that includes user interface elements. The computer may be a general-purpose computer or a special purpose computer. This computer 900 can be used to implement any components of the work load balancing architecture as described herein. Different components of the system, e.g., as depicted in FIGS. 1-3 may be implemented on one or more computers such as computer 900, via its hardware, software program, firmware, or a combination thereof. Although only one such computer is shown, for convenience, the computer functions relating to work load balancing may be implemented in a distributed fashion on a number of similar platforms, to distribute the processing load.

The computer 900, for example, includes COM ports 902 connected to and from a network connected thereto to facilitate data communications. The computer 900 also includes a central processing unit (CPU) 904, in the form of one or more processors, for executing program instructions. The exemplary computer platform includes an internal communication bus 906, program storage and data storage of different forms, e.g., disk 908, read only memory (ROM) 910, or random access memory (RAM) 912, for various data files to be processed and/or communicated by the computer, as well as possibly program instructions to be executed by the CPU. The computer 900 also includes an I/O component 914, supporting input/output flows between the computer and other components therein such as user interface elements 916. The computer 900 may also receive programming and data via network communications.

Hence, aspects of the method of balancing work load in a distributed system, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firm ware/hard ware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on at least one machine each having at least one processor, storage, and a communication platform connected to a network for balancing work load in a distributed system, comprising the steps of:
   ranking a plurality of resource units in the distributed system based a plurality of multi-dimensional load metrics determined from each of the plurality of resource units;
   dividing the plurality of resource units into a plurality of resource unit groups based on the ranking of the plurality of resource units;
   forming at least one pair of resource unit groups, wherein each of the at least one pair of resource unit groups is assigned with a probability of load balancing action; and
   for each pair of resource unit groups, determining a load balancing action based on the assigned probability of load balancing action, wherein
   for each pair of resource unit groups, a first resource unit group is selected from top half of resource unit groups in the ranking, and a second resource unit group is selected from bottom half of resource unit groups in the ranking.

2. The method of claim 1, further comprising the step of performing the determined plurality of load balancing actions in parallel for each pair of resource unit groups.

3. The method of claim 1, wherein the load balancing action includes at least one of:
   exchanging work between two resource units or resource unit groups,
   assigning work to a resource unit,
   re-assigning work from one resource unit to another resource unit,
   splitting work among a plurality of resource units, and
   keeping the current work assignment.

4. The method of claim 1, wherein probabilities of load balancing actions are different from each other among different pairs of resource unit groups.

5. The method of claim 1, wherein a relative position of the first resource unit group with respect to a middle of the ranking is the same as that of the second resource unit group with respect to the middle of the ranking.

6. The method of claim 5, wherein the probability of load balancing action assigned to each pair of resource unit groups is determined based on the relative positions.

7. The method of claim 6, wherein the probability of load balancing action decreases as the relative positions get closer to the middle of the ranking.

8. The method of claim 1, wherein the plurality of multi-dimensional load metrics include at least one of latency, query length, storage usage, processing unit usage, memory usage, input/output unit usage, and any combination thereof.

9. A system for balancing work load in a distributed system, comprising a load controller implemented on at least one processor, the load controller comprising:
   a ranking module configured to:
      rank a plurality of resource units in the distributed system based a plurality of multi-dimensional load metrics determined from each of the plurality of resource units, and
      divide the plurality of resource units into a plurality of resource unit groups based on the ranking of the plurality of resource units; and an action module configured to:
- form a plurality of pairs of resource unit groups, wherein each pair of resource unit groups is assigned with a probability of load balancing action, and
- for each pair of resource unit groups, determine a load balancing action based on the assigned probability of load balancing action, wherein
- for each pair of resource unit groups, a first resource unit group is selected from top half of resource unit groups in the ranking, and a second resource unit group is selected from bottom half of resource unit groups in the ranking.

10. The system of claim 9, further comprising a load assignment manager operatively coupled to the load controller and configured to perform the determined plurality of load balancing actions in parallel for each pair of resource unit groups.

11. The system of claim 9, wherein the load balancing action includes at least one of:
- exchanging work between two resource units or resource unit groups,
- assigning work to a resource unit,
- re-assigning work from one resource unit to another resource unit,
- splitting work among a plurality of resource units, and
- keeping the current work assignment.

12. The system of claim 9, wherein probabilities of load balancing actions are different from each other among different pairs of resource unit groups.

13. The system of claim 9, wherein a relative position of the first resource unit group with respect to a middle of the ranking is the same as that of the second resource unit group with respect to the middle of the ranking.

14. The system of claim 13, wherein the probability of load balancing action assigned to each pair of resource unit groups is determined based on the relative positions.

15. The system of claim 14, wherein the probability of load balancing action decreases as the relative positions get closer to the middle of the ranking.

16. The system of claim 9, wherein the plurality of multi-dimensional load metrics include at least one of latency, query length, storage usage, processing unit usage, memory usage, input/output unit usage, and any combination thereof.

17. A machine-readable tangible and non-transitory medium having information recorded thereon for balancing work load in a distributed system, wherein the information, when read by the machine, causes the machine to perform the following:
- ranking a plurality of resource units in the distributed system based a plurality of multi-dimensional load metrics determined from each of the plurality of resource units;
- dividing the plurality of resource units into a plurality of resource unit groups based on the ranking of the plurality of resource units;
- forming at least one pair of resource unit groups, wherein each of the at least one pair of resource unit groups is assigned with a probability of load balancing action; and
- for each pair of resource unit groups, determining a load balancing action based on the assigned probability of load balancing action, wherein
- for each pair of resource unit groups, a first resource unit group is selected from top half of resource unit groups in the ranking, and a second resource unit group is selected from bottom half of resource unit groups in the ranking.

18. The medium of claim 17, further comprising the step of performing the determined load balancing action in parallel for each pair of resource unit groups.

* * * * *